United States Patent
Ikeda et al.

(10) Patent No.: US 10,458,850 B2
(45) Date of Patent: Oct. 29, 2019

(54) ELECTRONIC DEVICE AND PYROELECTRIC SENSOR

(71) Applicant: Panasonic Intellectual Property Management Co., Ltd., Osaka (JP)

(72) Inventors: Shinji Ikeda, Osaka (JP); Kazuho Sakurai, Kanagawa (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 185 days.

(21) Appl. No.: 15/557,570

(22) PCT Filed: Mar. 3, 2016

(86) PCT No.: PCT/JP2016/001155
§ 371 (c)(1),
(2) Date: Sep. 12, 2017

(87) PCT Pub. No.: WO2016/157723
PCT Pub. Date: Oct. 6, 2016

(65) Prior Publication Data
US 2018/0052055 A1    Feb. 22, 2018

(30) Foreign Application Priority Data

Mar. 27, 2015  (JP) ................ 2015-065875
Jan. 21, 2016  (JP) ................ 2016-009965

(51) Int. Cl.
*G01J 5/00*    (2006.01)
*G01K 15/00*   (2006.01)
(Continued)

(52) U.S. Cl.
CPC .......... *G01J 5/0025* (2013.01); *G01J 1/02* (2013.01); *G01J 5/00* (2013.01); *G01J 5/34* (2013.01);
(Continued)

(58) Field of Classification Search
USPC ................... 374/121, 129, 163, 1
See application file for complete search history.

(56) References Cited

U.S. PATENT DOCUMENTS

2012/0006988 A1   1/2012  Tatsuoka
2016/0003494 A1*  1/2016  Kim ............... B60H 1/00642
                                                    700/276
(Continued)

FOREIGN PATENT DOCUMENTS

EP  1291629 A2  3/2003
JP  6-003366    1/1994
(Continued)

OTHER PUBLICATIONS

The Extended European Search Report dated Mar. 7, 2018 for the related European Patent Application No. 16771617.4.
(Continued)

*Primary Examiner* — Mirellys Jagan
(74) *Attorney, Agent, or Firm* — McDermott Will & Emery LLP

(57) ABSTRACT

A electronic device includes a pyroelectric element that senses a thermal change, a detector, and a controller. The detector detects the movement of the subject based on a detection signal output from the pyroelectric element. The controller sets detection sensitivity of the detector based on a result of the detection by the detector. The detection sensitivity is set to low sensitivity or high sensitivity. The controller sets the detection sensitivity to the high sensitivity when the detector has detected the movement of the subject. The controller sets the detection sensitivity to the low sensitivity when a predetermined period has elapsed without the detector detecting the movement of the subject in the state where detection sensitivity is the high sensitivity.

10 Claims, 13 Drawing Sheets

(51) Int. Cl.
*G01K 7/00* (2006.01)
*G01J 1/02* (2006.01)
*G01J 5/34* (2006.01)
*G01J 5/52* (2006.01)

(52) U.S. Cl.
CPC ....... *G01J 5/522* (2013.01); *G01J 2005/0048* (2013.01)

(56) References Cited

U.S. PATENT DOCUMENTS

2016/0138824 A1\* 5/2016 Patel .................. F24F 11/30 700/276
2016/0138976 A1\* 5/2016 Schilz ................ G08B 13/193 250/338.1

FOREIGN PATENT DOCUMENTS

| JP | 10-049094 | 2/1998 |
| JP | 2852582 B2 | 2/1999 |
| JP | 2000-242255 | 9/2000 |
| JP | 2009-244158 | 10/2009 |
| JP | 2012-018034 | 1/2012 |

OTHER PUBLICATIONS

International Search Report of PCT application No. PCT/JP2016/001155 dated May 24, 2016.

\* cited by examiner

ELECTRONIC DEVICE AND PYROELECTRIC SENSOR

This application is a U.S. national stage application of the PCT International Application No. PCT/JP2016/001155 filed on Mar. 3, 2016, which claims the benefit of foreign priority of Japanese patent applications No. 2015-065875 and No. 2016-009965 filed on Mar. 27, 2015 and Jan. 21, 2016, respectively, the contents all of which are incorporated herein by reference.

TECHNICAL FIELD

The present disclosure relates to a pyroelectric sensor and an electronic device including the pyroelectric sensor.

BACKGROUND ART

A pyroelectric sensor is a type of thermal sensors that uses a pyroelectric element that is polarized by infrared ray emitted from a heat source such as a human body. There is known a technique of mounting a pyroelectric sensor on an electronic device so that the electronic device automatically operates based on detection of presence/absence of a human such as a user of the electronic device.

Practical examples of the pyroelectric sensor include illumination in a bathroom or the like. The usage of the pyroelectric sensor in this example is as follows. In a normal state where no human is present, the pyroelectric sensor is energized so that the pyroelectric sensor enters a standby state, during which illumination is extinguished. When a human approaches the pyroelectric sensor, an electromotive force occurs at the pyroelectric sensor, whereby the illumination is lit. If the pyroelectric sensor does not detect a human in a subsequent certain period, the illumination is extinguished and the pyroelectric sensor returns to the standby state.

Further, Patent Literature 1 discloses a display apparatus. The display apparatus can reduce power consumption during standby, by controlling lighting/extinguishing of a display element that is used for displaying time points or channels in a recorder recording television programs or the like. The display apparatus of Patent Literature 1 uses a pyroelectric sensor and a timer. Upon detection of a user by the pyroelectric sensor, the display element and the timer are turned on. After the timer has measured a predetermined time, the display element is turned off.

With illumination or a display apparatus including a pyroelectric sensor such as the one described above, automatic lighting can improve the convenience of the user. Further, automatic extinguishing can achieve power saving.

CITATION LIST

Patent Literature

PTL 1: Unexamined Japanese Patent Publication No. 10-049094

SUMMARY

The conventional technique is associated with a problem that, even when a human is present in a sensible area of a pyroelectric sensor, the pyroelectric sensor does not detect the human unless the human makes a large movement. That is, detection of a small movement of a human is hard to be detected. Accordingly, for example, when the pyroelectric sensor fails to detect a human and illumination is extinguished, the human must make a large body movement for turning on the illumination again.

The present disclosure provides, in connection with an electronic device and a pyroelectric sensor that operate upon detection of a movement of a subject by using a pyroelectric element, an electronic device and a pyroelectric sensor capable of precisely detecting a subject with a lower possibility of a detection failure.

The electronic device of the present disclosure is an electronic device that detects a movement of a subject and operates in accordance with a result of the detection. The electronic device includes a pyroelectric element, a detector, and a controller. The pyroelectric element senses a thermal change based on a pyroelectric effect. The detector detects the movement of the subject based on a detection signal output from the pyroelectric element. The controller sets detection sensitivity of the detector based on a result of the detection by the detector. The detection sensitivity is set to low sensitivity or high sensitivity being higher in sensitivity than the low sensitivity. The controller sets the detection sensitivity to the high sensitivity when the detector has detected the movement of the subject. The controller sets the detection sensitivity to the low sensitivity when a predetermined period has elapsed without the detector detecting the movement of the subject in a state where the detection sensitivity is the high sensitivity.

In the electronic device of the present disclosure, when the detector has detected a movement of a subject based on a detection signal from the pyroelectric element, the detection sensitivity is set to high sensitivity. Thus, with an electronic device that operates upon detection of a movement of a subject using a pyroelectric element, the subject can be precisely detected with a lower possibility of a detection failure.

DESCRIPTION OF EMBODIMENTS

Figure 1A:
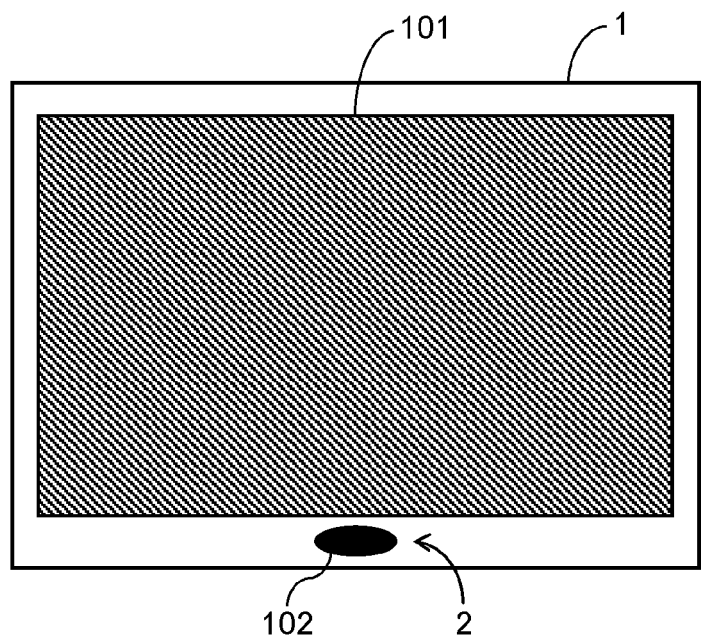
FIG. 1A is a diagram schematically showing an example of a front side view of a display apparatus according to a first exemplary embodiment.

In the following, a detailed description of exemplary embodiments will be given with reference to the drawings as appropriate. Note that, an excessively detailed description may be omitted. For example, a detailed description of a well-known matter or a repetitive description of substantially identical structures may be omitted. This is to avoid unnecessary redundancy in the following description, and to facilitate understanding of a person skilled in the art.

Note that, the accompanying drawings and the following description are provided for a person skilled in the art to fully understand the present disclosure, and they are not intended to limit the subject disclosed in the scope of claims.

Further, the drawings are schematic drawings, and not necessarily show exact dimensions. Further, in the drawings, substantially identical constituents are denoted by identical reference marks, and the description thereof may be omitted or simplified.

First Exemplary Embodiment

In the following, a description of a first exemplary embodiment will be given with reference to FIGS. 1A to 8.
[1-1. Structure]
[1-1-1. Overview]

In the first exemplary embodiment, as an example of an electronic device equipped with a pyroelectric sensor, a description will be given of an exemplary display apparatus such as a television receiver (hereinafter referred to as a "TV"). Display apparatus 1 according to the present exemplary embodiment has an automatic ON/OFF function using pyroelectric sensor 2. By performing the operation of the automatic ON/OFF function, display apparatus 1 is automatically switched between two states, namely, an "operating state" in which an image displaying surface is lit and a "standby state" in which the displaying surface is extinguished, depending on the presence/absence of the user.

Figure 1B:
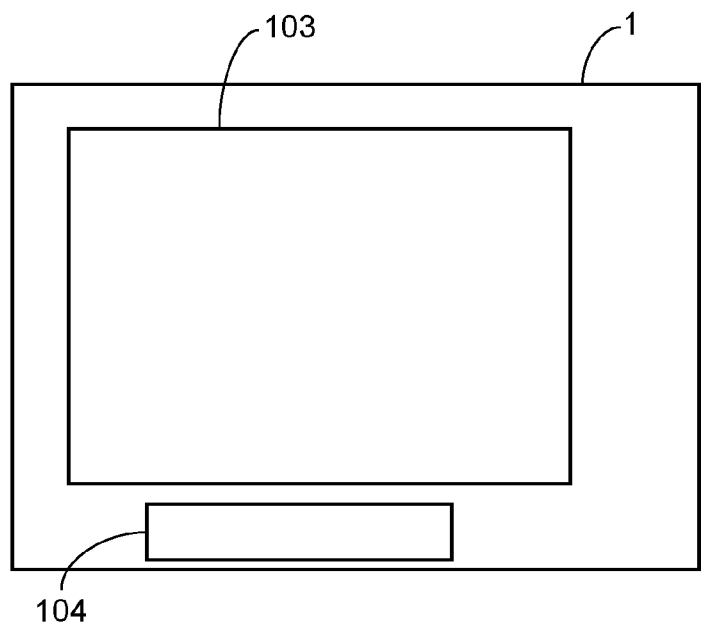
FIG. 1B is a diagram schematically showing an example of a back side view of the display apparatus according to the first exemplary embodiment.

With reference to FIGS. 1A and 1B, a description will be given of the overview of display apparatus 1 according to the first exemplary embodiment.

FIG. 1A is a diagram schematically showing an example of the front side view of display apparatus 1 according to the first exemplary embodiment. FIG. 1B is a diagram schematically showing an example of the back side view of display apparatus 1 according to the first exemplary embodiment. Note that, FIG. 1B shows the back side of the display apparatus 1 from which a back cover is removed, and schematically shows the inside of display apparatus 1.

Note that, the front side of display apparatus 1 is the side on which an image is displayed on display 101 of display apparatus 1.

As shown in FIG. 1A, on the front side of display apparatus 1, that is, on the image displaying surface side, display 101 and pyroelectric sensor 2 covered with lens 102 are disposed.

As shown in FIG. 1B, on the back side (inside) of display apparatus 1, signal processing substrate 103 on which main functions of display apparatus 1 are implemented, and front substrate 104 on which pyroelectric sensor 2 is mounted are disposed. Signal processing substrate 103 and front substrate 104 are connected to each other (not shown). Further, front substrate 104 has a shape accommodated in the periphery of display 101 so as to correspond to lens 102 on the displaying surface side (for example, an elongated rectangular whose short side is about 10 mm). Note that, in display apparatus 1, substrates other than signal processing substrate 103 and front substrate 104 may exist.

Note that, in the following, circuits and devices not directly relating (or not closely relating) to the technique disclosed in the present exemplary embodiment will not be described nor shown in the drawings.

In display apparatus 1, pyroelectric sensor 2 is disposed at a relatively narrow region having a width of about 10 mm in the periphery of display 101, so as to be unobtrusive for the user of display apparatus 1. This reduces the user's feeling of being monitored when the automatic ON/OFF function is executed with the display apparatus 1.

In order for pyroelectric sensor 2 to be unobtrusive, pyroelectric sensor 2 must be reduced in size, and consequently noises associated with the size reduction must be addressed. With display apparatus 1, detection sensitivity of pyroelectric sensor 2 changes in accordance with a result of detection, by pyroelectric sensor 2, of a movement of a human. Thus, display apparatus 1 can precisely detect the user using pyroelectric sensor 2 being reduced in size. Note that, in connection with display apparatus 1, a subject from which infrared ray is sensed by pyroelectric sensor 2 is assumed to be a human including the user. However, in the present exemplary embodiment, the subject is not limited to a human. The subject may be any heat source that emits infrared ray or the like, and may be, for example, an animal
[1-1-2. Structure of Display Apparatus]

Figure 2:
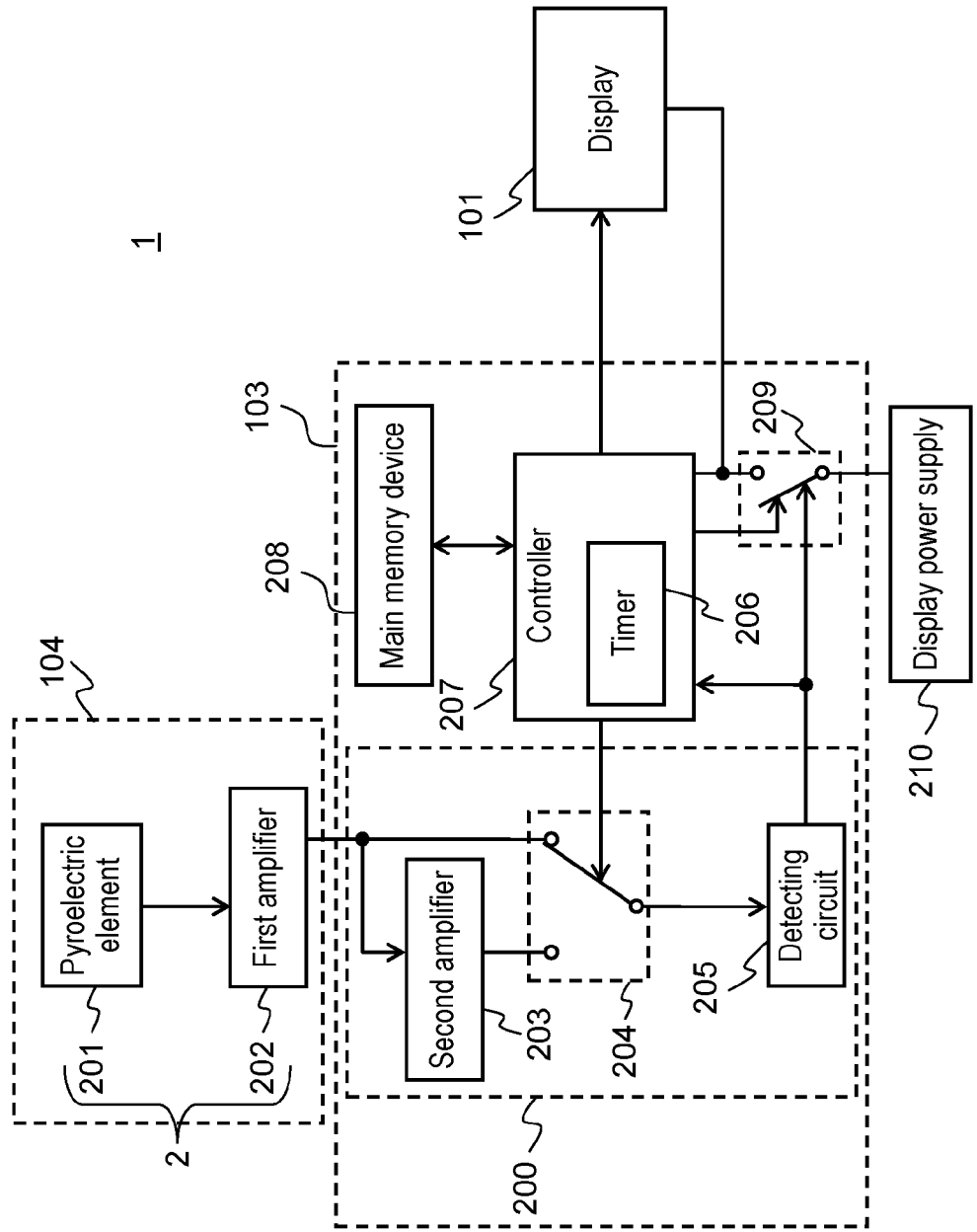
FIG. 2 is a block diagram schematically showing an exemplary structure of the display apparatus according to the first exemplary embodiment.

With reference to FIGS. 1A to 2, a description will be given of the structure of display apparatus 1 according to the present exemplary embodiment.

FIG. 2 is a block diagram schematically showing an exemplary structure of display apparatus 1 according to the first exemplary embodiment.

As shown in FIG. 2, display apparatus 1 includes display 101, pyroelectric sensor 2, detector 200, controller 207, main memory device 208, second switch 209, and display power supply 210.

Pyroelectric element 201 and first amplifier 202 that structure pyroelectric sensor 2 are provided on front substrate 104.

Detector 200 is structured to include second amplifier 203, first switch 204, and detecting circuit 205. Second amplifier 203, first switch 204, detecting circuit 205, controller 207 including timer 206, main memory device 208, and second switch 209 are provided on signal processing substrate 103.

Display 101 is structured by, for example, a liquid crystal display, an organic electroluminescence display or the like.

Pyroelectric sensor 2 includes lens 102, pyroelectric element 201, and first amplifier 202. Lens 102 is structured by a Fresnel lens, for example. Pyroelectric element 201 is structured to include an infrared absorbing filter, a pyroelectric material, and a transistor. In pyroelectric element 201, positive and negative electrodes are alternately disposed. In pyroelectric sensor 2, the positive and negative electrodes are disposed such that light from a region being the field of view (sensible area) of pyroelectric sensor 2 is incident on one of the positive or negative electrode of pyroelectric element 201 via lens 102. Pyroelectric element 201 senses a thermal change based on the pyroelectric effect in which the pyroelectric material is polarized in response to infrared ray. Then, pyroelectric element 201 outputs a signal in accordance with a movement of a human body in the sensible area on the front side of display apparatus 1 and heat fluctuations around the human body. Accordingly, the waveform of the output signal of pyroelectric element 201 includes not only components attributed to the motion of a human, but also noise components due to heat fluctuations around the human body to be the detection target (see FIGS. 3 to 5).

Note that, it is assumed that the sensible area is set to a range in which a user is expected to be present, for example, in case where there is a user watching an image displayed on display 101 of display apparatus 1.

The output signal of pyroelectric element 201 is amplified by first amplifier 202. Then, the amplified output signal is output, as a detection signal, from pyroelectric sensor 2 to detector 200. First amplifier 202 is, for example, structured by an operational amplifier, and has a predetermined amplification factor of 1,000 to 100,000. In the following, an exemplary structure in which first amplifier 202 is set to have an amplification factor of 10,000 is shown as an example.

Detector 200 detects a movement of a human (subject) based on a detection signal from pyroelectric sensor 2. In detector 200, a detection signal is input to second amplifier 203 and one of two contacts of first switch 204. Other one of the contacts of first switch 204 is connected to the output terminal of second amplifier 203, and the output terminal of first switch 204 is connected to the input terminal of detecting circuit 205. Second amplifier 203 is structured by, for example, an operational amplifier, and has a predetermined amplification factor of 1.5 to 15. In the following, an exemplary structure in which second amplifier 203 is set to have an amplification factor of 3 is shown as an example.

Switching operation of first switch 204 is controlled by a control signal from controller 207. First switch 204 passes, to detecting circuit 205, one of a detection signal of a high amplification factor as a result of amplification by a factor of 30,000 by first amplifier 202 and second amplifier 203, and a detection signal of a low amplification factor as a result of amplification by a factor of 10,000 by the first amplifier.

Detecting circuit 205 is structured to include a comparator, a reference voltage source (not shown) and the like. Detecting circuit 205 compares the voltage of the detection signal having passed through first switch 204 with each of threshold voltage S1 and threshold voltage S2 (S1>S2) (see FIGS. 3 to 5). In case where the voltage of the detection signal is higher than the higher threshold voltage S1 or lower than the lower threshold voltage S2, detecting circuit 205 outputs a detection result signal representing a detection result of detecting a movement of a human.

Controller 207 is structured by, for example, a CPU (Central Processing Unit), and controls the entire operation of display apparatus 1. Controller 207 realizes predetermined functions in cooperation with software. For example, controller 207 realizes functions such as lighting control of display 101 (including generation of an image to be displayed), switching control of first switch 204 and second switch 209, control of timer 206 and the like.

Timer 206 starts to measure a set period which is previously set on timer 206, when controller 207 activates display apparatus 1. The set period of timer 206 can be set to an arbitrary period. For example, the user may set the set period. Then, timer 206 resets the currently measuring time (hereinafter referred to as the "measurement period") based on a detection result signal from detector 200 when detector 200 detects a movement of a human.

Main memory device 208 is a storage medium that stores programs and data necessary for realizing the functions of display apparatus 1, and may be, for example, structured by a semiconductor device such as DRAM (Dynamic Random Access Memory), SRAM (Static Random Access Memory), flash memory or the like. Further, main memory device 208 may temporarily store data and function as a work area of controller 207.

Display power supply 210 is a power supply that supplies power to display 101 and controller 207 of display apparatus 1. Second switch 209 is connected between display 101 and controller 207, and display power supply 210.

Second switch 209 switched, by a detection result signal from detector 200, from OFF (the state where power from display power supply 210 is not supplied to controller 207 and display 101) to ON (the state where power from display power supply 210 is supplied to controller 207 and display 101). Thus, display power supply 210 is connected to display 101 and controller 207. Further, when the measurement period of timer 206 reaches the set period, second switch 209 switches from ON to OFF by a control signal from controller 207.

When second switch 209 is in ON state, power is supplied to controller 207 and display 101 from display power supply 210, and therefore controller 207 operates and display 101 can be lit. This state is the operating state of display apparatus 1. When second switch 209 is in OFF state, controller 207 and display 101 are not supplied with power from display power supply 210, and therefore controller 207 stops its operation and display 101 is extinguished. This state is the standby state of display apparatus 1.

Note that, pyroelectric sensor 2 including pyroelectric element 201 and first amplifier 202, detector 200 including second amplifier 203, and main memory device 208 are supplied with power from other power supply (not shown) provided separately from display power supply 210. In the present exemplary embodiment, when display apparatus 1 is in the standby state, power supply from display power supply 210 to controller 207 and display 101 stops. However, power supply from other power supply (not shown) to pyroelectric sensor 2, detector 200, and main memory device 208 continues. Thus, the time that is spent from activation of controller 207 to operation of display apparatus 1 can be largely shortened.

In the foregoing description, an example in which controller 207 is structured by a CPU has been described. However, controller 207 is not limited to a CPU, and may be structured by hardware circuit such as a dedicated electronic circuit or a reconfigurable electronic circuit designed to realize predetermined functions. Controller 207 may be structured by any of various semiconductor integrated circuits such as an MPU (Micro Processing Unit), a microcomputer, a DSP (Digital Signal Processor), an FPGA (Field Programmable Gate Array), an ASIC (Application Specific Integrated Circuit) and the like.

[1-2. Operation]

In the following, a description will be given of the operation of display apparatus 1 according to the present exemplary embodiment.

[1-2-1. Automatic ON/OFF Function]

Firstly, a description will be given of the automatic ON/OFF function of display apparatus 1 according to the present exemplary embodiment. Display apparatus 1 according to the present exemplary embodiment has an automatic ON function and an automatic OFF function. Note that, in the present exemplary embodiment, the automatic ON function and the automatic OFF function are collectively referred to as the automatic ON/OFF function. With display apparatus 1, when a human approaches display apparatus 1, display apparatus 1 is automatically activated and enters the operating state. This function is the automatic ON function. Further, with display apparatus 1, when the human leaves the area around display apparatus 1, display apparatus 1 automatically switches from the operating state to the standby state. This function is the automatic OFF function. Detection of the human around display apparatus 1 is performed by using pyroelectric sensor 2 (see FIGS. 1A to 2).

Note that, the area around display apparatus 1 refers to the range in which a human can watch the image displayed on display 101 of display apparatus 1, and is substantially identical to the sensible area. Accordingly, for example, the back side area of display apparatus 1 is not included in the area around display apparatus 1. Further, execution of the automatic ON function causes first switch 204 to be switched on the output terminal side of second amplifier 203, and second switch 209 is turned ON. Further, execution of the automatic OFF function causes first switch 204 to be switched on the output terminal side of first amplifier 202, and second switch 209 is turned OFF. Details of these operations will be described later.

Figure 3:
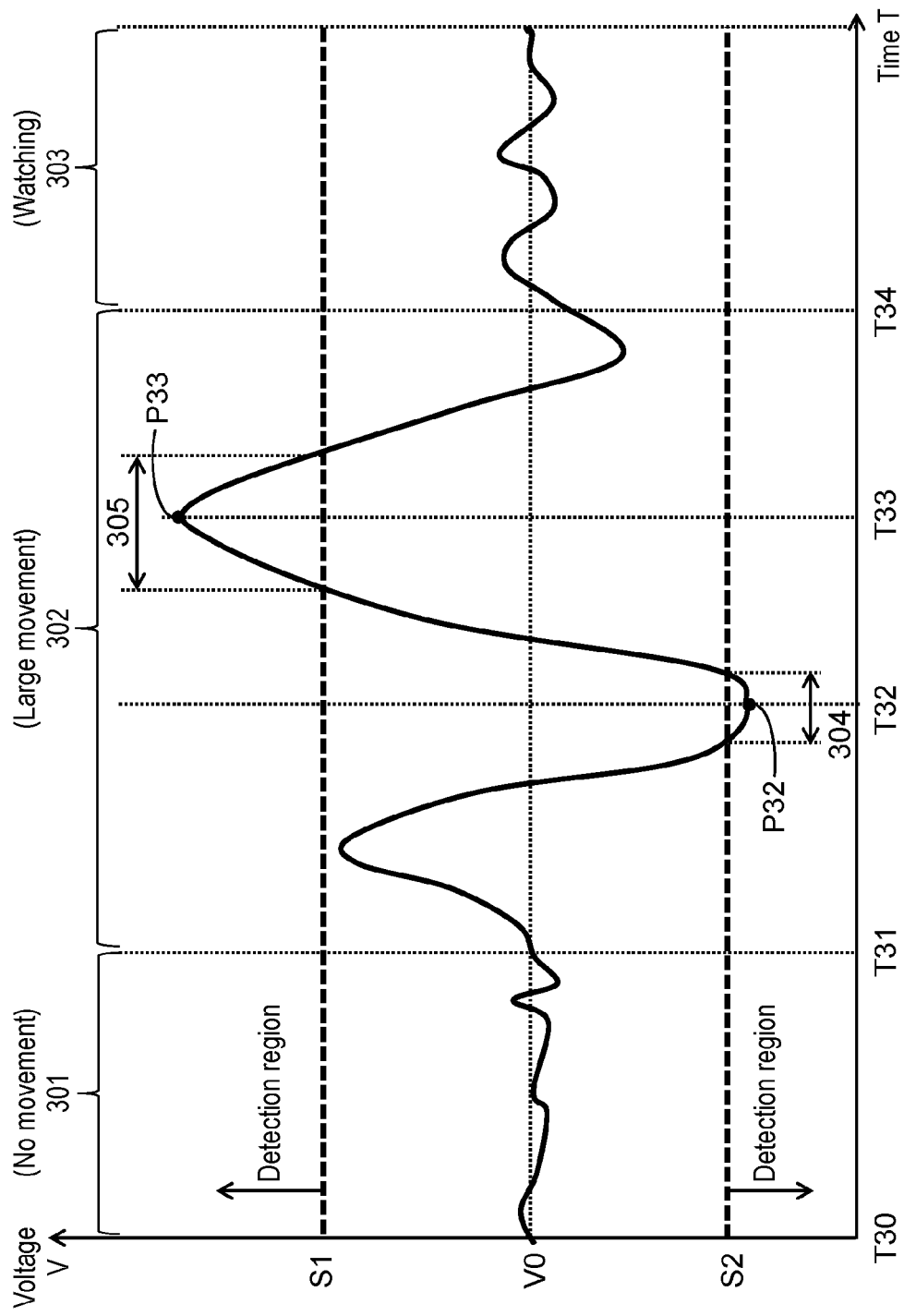
FIG. 3 is a waveform diagram showing an example of a detection signal when the display apparatus according to the first exemplary embodiment is in a low-sensitivity mode.
Figure 4:
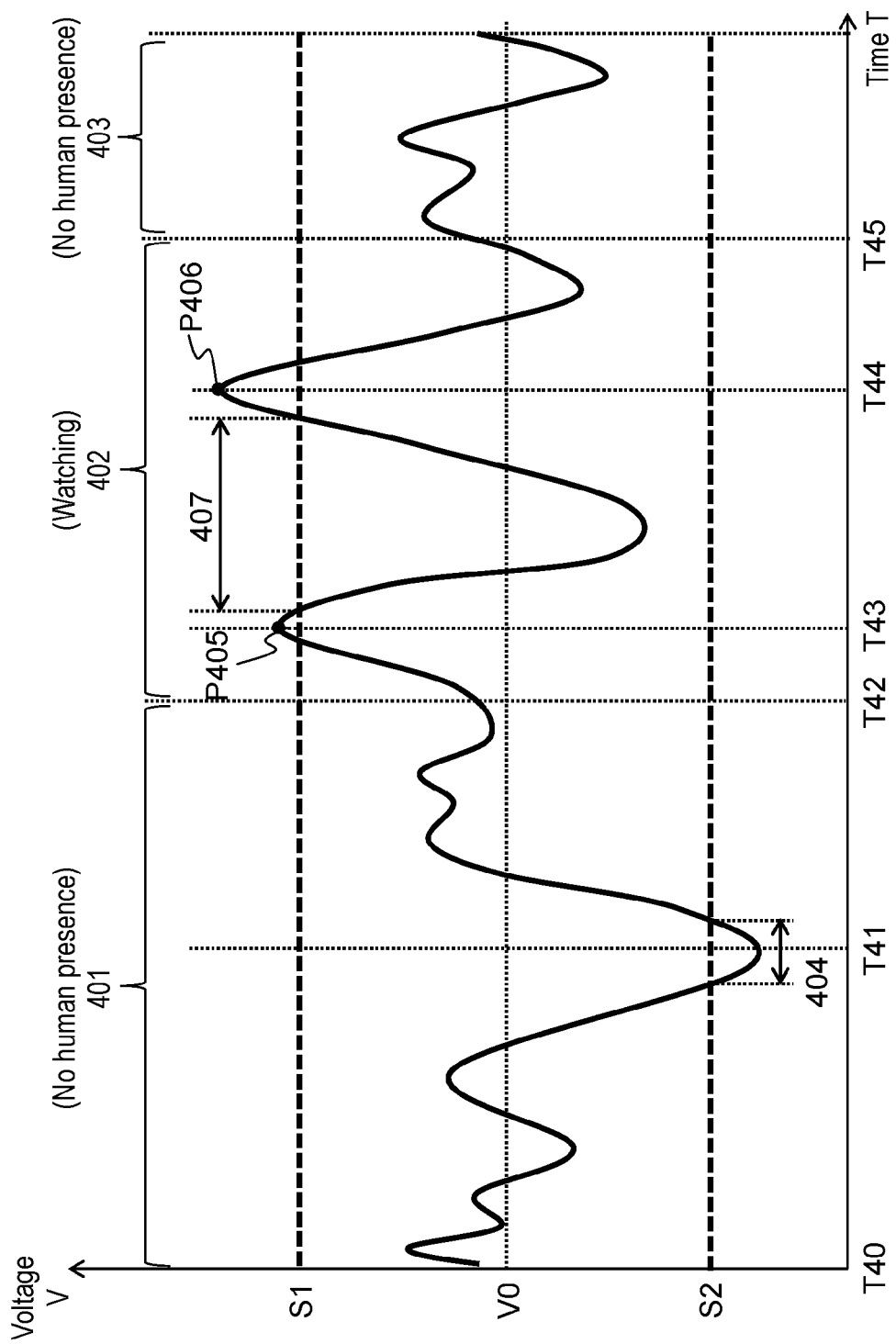
FIG. 4 is a waveform diagram schematically showing an example of a detection signal when the display apparatus according to the first exemplary embodiment is in a high-sensitivity mode.
Figure 5:
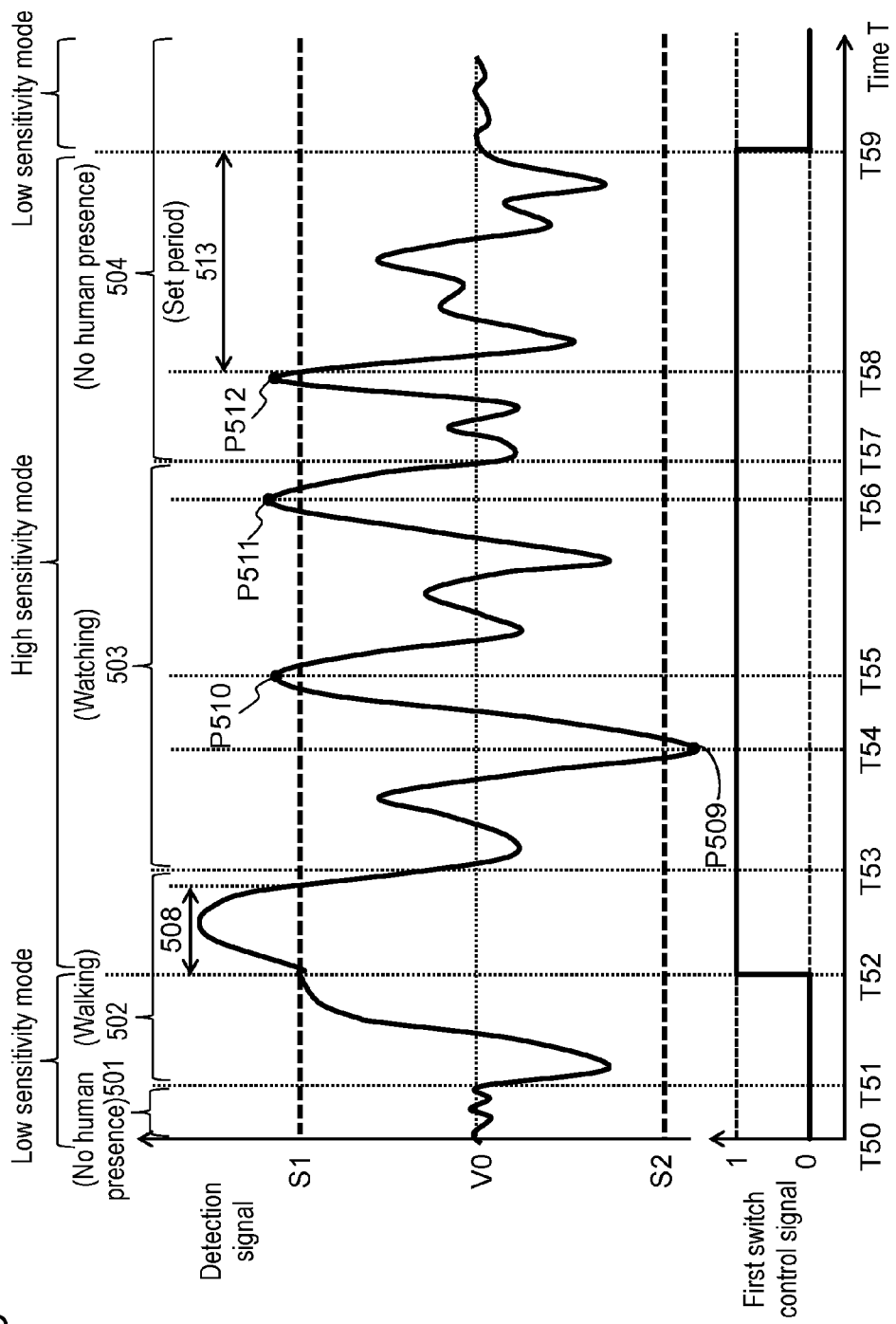
FIG. 5 is a waveform diagram showing an example of a detection sensitivity switching operation that is executed in the display apparatus according to the first exemplary embodiment.

FIGS. 3 to 5 are waveform diagrams exemplarily showing the waveform of a detection signal from pyroelectric sensor 2.

In FIGS. 3 to 5, the vertical axis represents voltage V, the horizontal axis represents time T, and V0 is the reference voltage of a detection signal.

FIGS. 3 to 5 show an exemplary waveform of a detection signal that is output to detector 200 from pyroelectric sensor 2 upon sensing a heat source in the area around display apparatus 1 (which will be detailed later). As shown in FIGS. 3 to 5, the voltage of a detection signal fluctuates to be higher and lower (in the positive direction and the negative direction) with reference to reference voltage V0. When pyroelectric element 201 of pyroelectric sensor 2 does not sense a thermal change, the voltage of a detection signal becomes substantially reference voltage V0. First amplifier 202 and second amplifier 203 operate to amplify the amplitude of a detection signal. The amplifiers may be different from each other in the reference voltage of an input signal and an output signal. In the present exemplary embodiment, it is assumed that the reference voltage after amplification performed by the amplifiers is V0.

As shown in FIGS. 3 to 5, on detecting circuit 205 of detector 200, threshold voltage S1 and threshold voltage S2 respectively higher and lower than reference voltage V0 are set. When detector 200 detects that the voltage of a detection signal reaches a voltage area higher than threshold voltage S1 or a voltage area lower than threshold voltage S2 (hereinafter referred to as the "detection region"), detector 200 outputs a predetermined detection result signal to second switch 209.

Thus, second switch 209 is turned ON, controller 207 is connected to display power supply 210 and supplied with power, whereby controller 207 is activated. Further, since display 101 is also connected to display power supply 210, display 101 is also supplied with power, and display 101 starts to display an image. In this manner, the automatic ON function is executed.

Further, when the voltage of a detection signal reaches a detection region, detector 200 transmits a detection result signal also to timer 206 of controller 207. Thus, timer 206 starts to measure time. When the measurement period of timer 206 reaches a preset set period and the time measurement is finished, controller 207 turns OFF second switch 209 to execute the automatic OFF function of display apparatus 1. Thus, display apparatus 1 enters the standby state. On the other hand, when detector 200 detects that the voltage of the detection signal again reaches the detection region during time measurement of timer 206, that is, while display 101 is lit, controller 207 resets timer 206 and timer 206 again starts to measure time from the initial state. Thus, control of maintaining the lit state of display 101 is executed.

[1-2-2. Counter Measures Against Noise Associated with Pyroelectric Sensor]

As described above, the automatic ON/OFF function of display apparatus 1 is executed by detecting a human in the area around display apparatus 1 by using pyroelectric sensor 2. However, since pyroelectric sensor 2 is a sensor that captures a movement of a heat source, it is difficult to detect a small movement and get an output. Further, since pyroelectric sensor 2 senses heat fluctuations of not only a human but others, it is difficult to detect a relatively small movement (a movement of a human) that is hidden in heat fluctuations of the background of a human.

Further, since an output signal of pyroelectric element 201 is very small, the output signal is amplified in a stage following pyroelectric element 201 by a factor of several thousands to tens of thousands to be used. Here, when the signal-to-noise ratio (S/N ratio) of the output signal is small, noise becomes significant also in the waveform of the amplified signal. Further, noise is also caused by heat fluctuations in the background of a human in the sensible area of pyroelectric sensor 2, heat fluctuations around pyroelectric sensor 2, and the temperature of the body of pyroelectric element 201 of pyroelectric sensor 2. Further, as such noise, there exists white noise that is generated in any circuit or wiring included in pyroelectric sensor 2. However, white noise can be removed to some extent by causing the output signal to pass through a low-pass filter. Hence, noise that is to be problem in detecting a human by using pyroelectric sensor 2 is noise due to heat fluctuations in the background of a human.

There may be several schemes for improving the S/N ratio of an output signal of pyroelectric element 201 to a small movement of a human (subject), which are listed below.

The first example is to use pyroelectric element 201 of larger size in pyroelectric sensor 2.

The second example is to use a lens of larger size in pyroelectric sensor 2, thereby increasing the efficiency of collecting light onto pyroelectric element 201.

The third example is to use a larger number of lenses in pyroelectric sensor 2, thereby increasing the number of divided regions in pyroelectric element 201 (narrowing a detection area per lens).

The fourth example is to dispose pyroelectric sensor 2 closer to a detection target.

The schemes above can improve the sensitivity of pyroelectric sensor 2 to a small movement of a subject. Note that, herein, the factors such as the conversion efficiency of pyroelectric element 201, transmittance of the lens and the like are not included in the schemes of improving the S/N ratio.

As described above, there are several schemes as counter measures against noise associated with pyroelectric sensor 2. However, the schemes other than the fourth example all bring an increase in size and costs of pyroelectric sensor 2. On the other hand, the fourth example is difficult to be applied to an electronic device with which the position of the user using the apparatus is not determined, such as display apparatus 1.

Further, an increase in size of pyroelectric sensor 2 influences the design of a product equipped with pyroelectric sensor 2. For example, when display apparatus 1 is a TV in which the width of the periphery of display 101 is extremely narrow, in case of mounting pyroelectric sensor 2 on display apparatus 1, pyroelectric sensor 2 which is small size corresponding to the width of the periphery of display 101 is needed.

When pyroelectric sensor 2 of large size can be used for display apparatus 1, the amplification factor of pyroelectric element 201 to an output signal can be reduced to about several thousands. In this case, by reducing amplification factor, the S/N ratio is improved, and probability of occurrence of error in detection due to the noise is reduced. However, as described above, in case where pyroelectric sensor 2 must be reduced in size due to restriction on design or the like, it is difficult to improve the S/N ratio of an output signal of pyroelectric element 201 as compared to the case where pyroelectric sensor 2 of large size is used, and erroneous detection due to noise is more likely to occur.

Accordingly, the present exemplary embodiment employs two detection modes in executing the automatic ON/OFF function with display apparatus 1, namely, a low-sensitivity mode and a high-sensitivity mode, which differ from each other in sensitivity of detector 200 detecting a movement of a human. In the following, a description will be given of the low-sensitivity mode and the high-sensitivity mode of detector 200 in display apparatus 1.

[1-2-3-1. Low-Sensitivity Mode]

With reference to FIG. 3, a description will be given of the low-sensitivity mode of detector 200 of display apparatus 1 according to the present exemplary embodiment.

FIG. 3 is a waveform diagram showing an example of a detection signal when display apparatus 1 according to the first exemplary embodiment is in the low-sensitivity mode.

In FIG. 3, period 301 from time point T30 to time point T31 represents the state where no human is present in the area around display apparatus 1 (no movement). Period 302 from time point T31 to time point T34 represents the state where a large movement of a heat source has occurred (large movement occurs) because of a human coming in front of display apparatus 1 or the like. Period 303 following time point T34 represents the state where a movement of a heat source is relatively small (watching) because a human has stopped moving to watch display apparatus 1 or the like.

When display apparatus 1 is in the low-sensitivity mode, an output signal of pyroelectric element 201 is amplified only by first amplifier 202 (for example, amplified by a factor of 10,000). In the following, the amplification factor of an output signal of pyroelectric element 201 being amplified only by first amplifier 202 is referred to as the "low amplification factor". Then, detector 200 performs a detecting operation based on the detection signal amplified by the low amplification factor. Detector 200 in the low-sensitivity mode has the detection sensitivity corresponding to the low amplification factor.

As shown in FIG. 3, in period 301 where no human is present in the area around display apparatus 1, the voltage of the detection signal is near reference voltage V0. However, the voltage of the detection signal slightly fluctuates to be higher and lower relative to reference voltage V0 due to noise. On the other hand, in period 302 where there is a large movement of a human (heat source), the voltage of the detection signal becomes lower than threshold voltage S2 and reaches the detection region in period 304 including peak (a change point in the waveform of the detection signal) P32 occurring at time point T32. Further, in period 305 including peak P33 occurring at time point T33, the voltage of detection signal becomes higher than threshold voltage S1 and reaches the detection region.

At this time, detector 200 detects an output signal of pyroelectric element 201 amplified by first amplifier 202 as a detection signal. Then, detector 200 detecting that the voltage of the detection signal has reached the detection region controls second switch 209, thereby connecting display 101 to display power supply 210 and starting to measure time by timer 206.

Normally, the movement of a human watching display apparatus 1 is smaller than the movement of a human coming in front of display apparatus 1 on foot or the like. Accordingly, in period 303 where a human is watching display apparatus 1, while the voltage of a detection signal slightly fluctuates sometime in accordance with a slight movement of the human, the voltage does not reach the detection regions exceeding the region between threshold voltage S1 and threshold voltage S2.

As described above, when display apparatus 1 is in the low-sensitivity mode, even though noise is superimposed on a detection signal, detector 200 can detect a large movement of a heat source, which is caused by, for example, walking of a human during period 302. Accordingly, it is considered that the automatic ON function properly functions in display apparatus 1.

However, when the low-sensitivity mode continues also in period 303 where a human is watching display apparatus 1, detector 200 may fail to detect a relatively small movement of a heat source, such as a slight movement of a human watching display apparatus 1 (that is, detection failure may occur). In such a case, despite a human watching display apparatus 1, timer 206 may not be reset, a set period set on timer 206 may expire, and the automatic OFF function may operate to extinguish display 101. As described above, the continuing low-sensitivity mode may cause the automatic OFF function to erroneously operate.

[1-2-3-2. High-Sensitivity Mode]

Next, with reference to FIG. 4, a description will be given of the high-sensitivity mode of detector 200. FIG. 4 is a waveform diagram showing an example of a detection signal when display apparatus 1 according to the first exemplary embodiment is in the high-sensitivity mode.

In FIG. 4, period 401 from time point T40 to time point T42 and period 403 following time point T45 represent the state where no human is present in the area around display apparatus 1 (no human presence). Further, period 402 from time point T42 to time point T45 represents the state where a human is watching display apparatus 1 (watching).

When display apparatus 1 is in the high-sensitivity mode, an output signal of pyroelectric element 201 is amplified by both first amplifier 202 and second amplifier 203 (for example, amplified by a factor of 30,000). In the following, the amplification factor for an output signal of pyroelectric element 201 being amplified by both first amplifier 202 and second amplifier 203 is referred to as the "high amplification factor". Then, detector 200 performs a detecting operation based on the detection signal amplified by the high amplification factor. The detection sensitivity of detector 200 in the high-sensitivity mode is enhanced corresponding to the difference in the amplification factor between the high amplification factor and the low amplification factor, and higher than the detection sensitivity in the low-sensitivity mode.

As shown in FIG. 4, in the high-sensitivity mode, in period 402 where a human is watching display apparatus 1, the voltage of the detection signal becomes higher than threshold voltage S1 and reaches the detection region at each of peak P405 occurring at time point T43 and its surrounding and peak P406 occurring at time point T44 and its surrounding. Thus, in the high-sensitivity mode, detector 200 can detect even a slight movement of a human watching display apparatus 1.

Further, what occurs in period 402 is a period from when the voltage of the detection signal becomes equal to or smaller than threshold voltage S1 after exceeding peak P405 until when the voltage becomes higher than threshold voltage S1 before peak P406, that is, time interval 407 in which the voltage of the detection signal is continuously equal to or smaller than threshold voltage S1. With display apparatus 1, in order to reduce the possibility of the automatic OFF function erroneously operating, that is, in order to prevent the automatic OFF function from operating by an expiration of the set period set on timer 206 during time interval 407, the set period of timer 206 is set to be fully long (for example, 10 minutes). This can increase the possibility of the measurement period of timer 206 being reset before the measurement period of timer 206 reaches the set period. Accordingly, the automatic OFF function can be suppressed from erroneously operating, such as extinguishing display 101 while a human is watching display 101 of display apparatus 1.

On the other hand, in the high-sensitivity mode, even in period 401 where no human is present in the area around display apparatus 1, as in period 404 including time point T41, noise components of the detection signal may reach the detection region. In this case, the automatic ON function operates and the display apparatus 1 is automatically activated. At this time, the automatic OFF function operates with display apparatus 1 if the time interval from when the voltage of the detection signal becomes outside the detection region (that is, equal to or higher than threshold voltage S2 and equal to or lower than threshold voltage S1) until when the voltage again reaches the detection region is longer than the set period set on the timer.

As described above, with display apparatus 1, when detector 200 performs a detecting operation constantly in the high-sensitivity mode, every time noise components of a detection signal reach the detection region by detector 200 detecting slight heat fluctuations, the automatic ON function may operate. This may cause the automatic ON function and the automatic OFF function to repeatedly operate even when no human is present around display apparatus 1.

[1-2-3-3. Detection Sensitivity Switching Operation]

As described above, with display apparatus 1, detector 200 in the low-sensitivity mode can detect only a relatively large movement of a human (heat source) and properly cause the automatic ON function to operate. However, on the other hand, it is difficult for detector 200 in the low-sensitivity mode to detect a relatively small movement of a human (heat source). Accordingly, the automatic OFF function may highly possibly erroneously operate (fail to detect a human despite the presence of the human watching display apparatus 1 in the sensible area, thereby causing display apparatus 1 to enter the standby state).

Conversely, with display apparatus 1, since detector 200 in the high-sensitivity mode can detect a relatively small movement of a human (heat source), detector 200 can properly detect a small movement of a human watching display apparatus 1 and prevent the automatic OFF function from erroneously operating. However, on the other hand, detector 200 in the high-sensitivity mode may detect heat fluctuations in the sensible area and cause the automatic ON function to erroneously operate (noise may be erroneously detected despite the absence of a human watching display apparatus 1 in the sensible area whereby display apparatus 1 enters the operating state).

As describe above, with display apparatus 1, when a detecting operation just in the low-sensitivity mode or just in the high-sensitivity mode is performed, the automatic ON/OFF function may not properly operate.

Accordingly, in display apparatus 1 according to the present exemplary embodiment, it is assumed that the low-sensitivity mode and the high sensitivity mode are automatically switched in each of the extinguishing mode and the lighting mode of display apparatus 1. Thus, the automatic ON/OFF function can precisely operate in display apparatus 1, and power saving can be achieved with display apparatus 1. In the following, with reference to FIGS. 5 and 6, a description will be given of a detection sensitivity switching operation in display apparatus 1.

FIG. 5 is a diagram showing an example of the detection sensitivity switching operation executed in display apparatus 1 according to the first exemplary embodiment. Note that, in FIG. 5, the upper diagram shows an example of the waveform of a detection signal of detector 200 of display apparatus 1. The lower diagram in FIG. 5 shows an example of a timing chart of a control signal for controlling first switch 204 that is generated based on the detection signal.

Note that, in the example shown in the lower diagram in FIG. 5, when the control signal is "0", first switch 204 is switched to the output terminal side of first amplifier 202, and detector 200 performs a detecting operation in the low-sensitivity mode. When the control signal is "1", first switch 204 is switched to the output terminal side of second amplifier 203, and detector 200 performs a detecting operation in the high-sensitivity mode.

Figure 6:
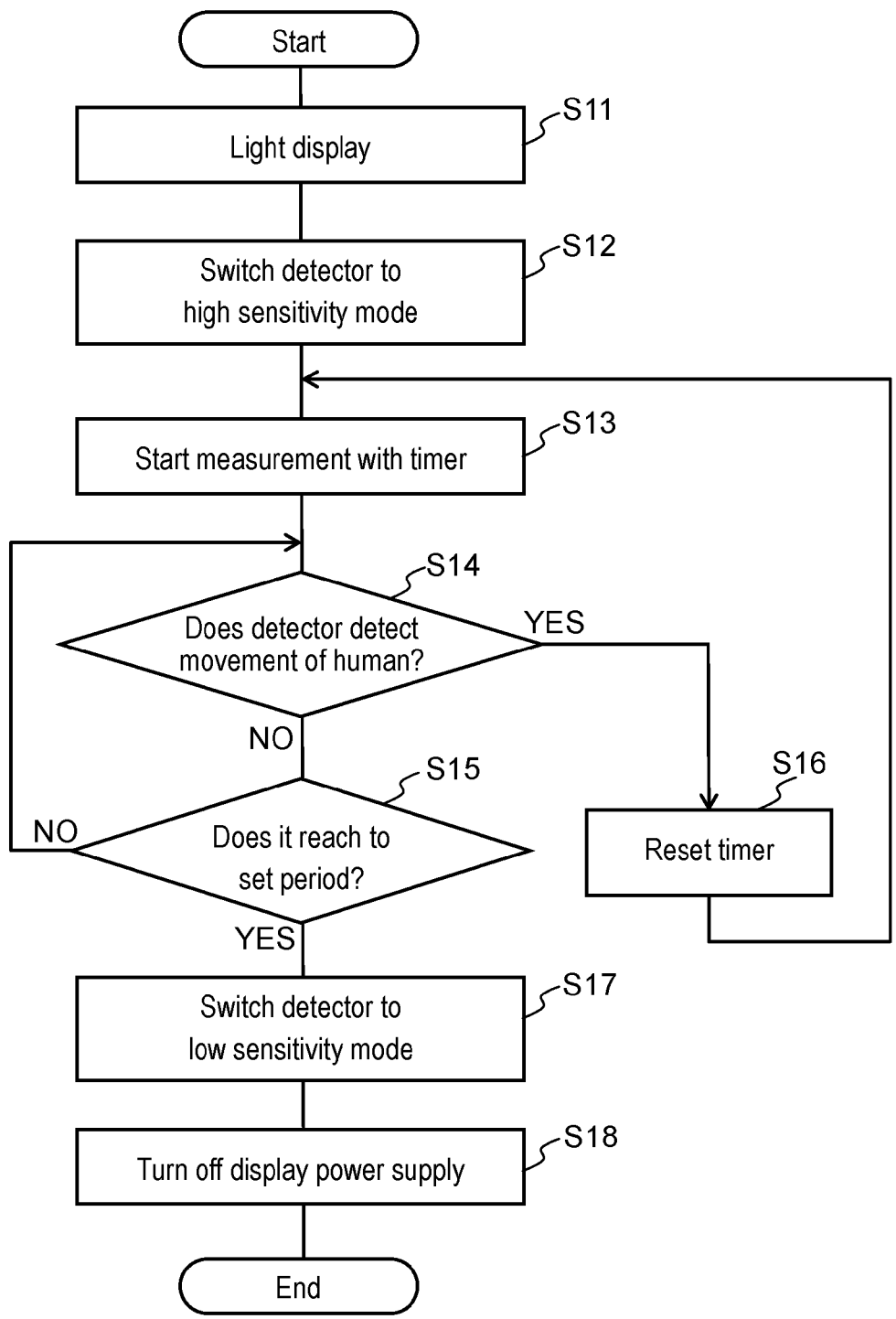
FIG. 6 is a flowchart showing an example of the detection sensitivity switching operation that is executed in the display apparatus according to the first exemplary embodiment.

FIG. 6 is a flowchart showing an example of the detection sensitivity switching operation executed in display apparatus 1 according to the first exemplary embodiment. Note that, the flowchart of FIG. 6 is executed by controller 207 of display apparatus 1. Further, the flowchart of FIG. 6 starts upon activation of controller 207.

In FIG. 5, period 501 from time point T50 to time point T51 shows the state where no human watching display apparatus 1 is present in the area around display apparatus 1 (no human presence). Period 502 from time point T51 to time point T53 shows the state where a human is approaching display apparatus 1 (walking) Period 503 from time point T53 to time point T57 shows the state where a human is watching display apparatus 1 (watching). Period 504 following time point T57 shows the state after a human leaves the area around display apparatus 1 (no human presence).

In an example shown in the lower diagram in FIG. 5, at time point T50, control signal is "0", detecting circuit 205 is connected to the output terminal of first amplifier 202 via first switch 204, and detector 200 is set to the low-sensitivity mode. Display apparatus 1 is in the standby state. In period 502, a human is walking toward display apparatus 1. By this state being sensed by pyroelectric element 201, as exemplarily shown in the upper diagram in FIG. 5, the amplitude of the detection signal becomes larger to be higher and lower (in the positive direction and the negative direction) with reference to reference voltage V0. Then, at time point T52, the voltage of the detection signal becomes higher than threshold voltage S1 and reaches the detection region. At this time, detector 200 outputs a detection result signal representing detection of a movement of a human. Thus, second switch 209 is turned ON, power supply from display power supply 210 to controller 207 and display 101 is started, and controller 207 is activated.

The activated controller 207 starts a series of processes shown in the flowchart of FIG. 6.

Firstly, controller 207 lights display 101 based on various data such as image data stored in main memory device 208 (step S11).

At this time, second switch 209 is in ON state, and display 101 is supplied with power from display power supply 210.

Further, controller 207 controls first switch 204 and switches detector 200 from the low-sensitivity mode to the high-sensitivity mode (step S12).

Specifically, as exemplarily shown in the lower diagram in FIG. 5, controller 207 changes, in step S12, the control signal that controls first switch 204 from "0" to "1". Thus, from time point T52 onward, detecting circuit 205 is connected to the output terminal of second amplifier 203 via first switch 204. That is, the output signal of pyroelectric element 201 is amplified by first amplifier 202 and second amplifier 203 by the high amplification factor (for example, amplified by a factor of 30,000), and the detection signal amplified by the high amplification factor is input to detecting circuit 205.

Further, controller 207 starts to measure time with timer 206 at time point T52 (step S13).

Next, controller 207 determines whether or not detector 200 has detected a movement of a human (fluctuations in a heat source), based on a detection result signal from detector 200 (step S14).

Since detector 200 is switched to the high-sensitivity mode in step S12, determination of detector 200 in step S14 is performed in the high-sensitivity mode.

When controller 207 determines that detector 200 has detected a movement of a human in step S14 (YES in step S14), controller 207 resets the measurement period of timer 206 (step S16). Then, controller 207 returns the process to step S13.

Thus, measurement of set period 513 with timer 206 is again started from the initial state. For example, the measurement period of timer 206 that has been started after a lapse of period 508 following time point T52 is reset before peak P509 occurring at time point T54, by the voltage of the detection signal becoming lower than threshold voltage S2 and reaching the detection region (that is, by a movement of a human being detected).

On the other hand, when controller 207 determines that detector 200 has not detected a movement of a human in step S14 (NO in step S14), controller 207 determines whether or not the measurement period with timer 206 has reached set period 513 (step S15).

When controller 207 determines that the measurement period with timer 206 has not reached set period 513 in step S15 (NO in step S15), controller 207 repeats step S14 and following processes until the measurement period with timer 206 reaches set period 513.

In the example shown in the upper diagram in FIG. 5, in period 503 where a human is watching display apparatus 1, the voltage of the detection signal becomes higher than threshold voltage S1 or lower than threshold voltage S2 at peak P509 occurring at time point T54 and its surrounding, peak P510 occurring at time point T55 and its surrounding, and peak P511 occurring at time point T56 and its surrounding, and reaches the detection regions. Then, the voltage of the detection signal reaching the detection regions is detected as a movement of a human by detector 200 in the high-sensitivity mode. In the example shown in the upper diagram in FIG. 5, the time interval between the peaks where the voltage of the detection signal is equal to or higher than threshold voltage S2 and equal to or lower than threshold voltage S1 is shorter than set period 513 set on timer 206 (for example, 10 minutes). Accordingly, controller 207 executes the process of step S16 every time the voltage of the detection signal reaches any of the detection regions, and repeatedly performs the processes of steps S13 to S16.

In period 504 where again no human is present in the area around display apparatus 1, the voltage of the detection signal shows peak P512 by noise components, and becomes higher than threshold voltage S1 at peak P512 and its surrounding and reaches the detection region.

In the example shown in the upper diagram in FIG. 5, the period from when the voltage of the detection signal becomes equal to or smaller than threshold voltage S1 after exceeding peak P511 and until when the voltage of the detection signal becomes higher than threshold voltage S1 before peak P512 is shorter than set period 513 set on timer 206 (for example, 10 minutes). Accordingly, when the voltage of the detection signal reaches the detection region before peak P512, timer 206 is reset. However, when there is no human present in the area around display apparatus 1, the voltage of the detection signal less frequently becomes higher than threshold voltage S1 or lower than threshold voltage S2 by noise components. In the example shown in the upper diagram in FIG. 5, in the period after time point T58 where the voltage of the detection signal becomes equal to or smaller than threshold voltage S1 after exceeding peak P512, the voltage of the detection signal does not reach the detection region. The measurement period of timer 206 reaches set period 513 at time point T59.

When controller 207 determines that the measurement period by timer 206 has reached set period 513 in step S15 (YES in step S15), controller 207 controls first switch 204 and switches detector 200 from the high-sensitivity mode to the low-sensitivity mode (step S17).

Specifically, in step S17, as shown in the lower diagram in FIG. 5, controller 207 changes the control signal that controls first switch 204 from "1" to "0". Thus, from time point T59 onward, detecting circuit 205 is connected to the output terminal of first amplifier 202 via first switch 204. That is, the output signal of pyroelectric element 201 is amplified by first amplifier 202 by the low amplification factor (for example, amplified by a factor of 10,000), and the detection signal amplified by the low amplification factor is input to detecting circuit 205.

Further, controller 207 turns OFF second switch 209 connected to display power supply 210 (step S18), and ends the process.

Thus, display power supply 210 and display 101 are disconnected from each other, and display 101 is not supplied with power from display power supply 210. In this manner, the automatic OFF function is executed by controller 207, and display apparatus 1 enters the standby state.

From the foregoing processes, with display apparatus 1, the amplification factor of a detection signal of pyroelectric sensor 2 is switched between the standby state and the operating state. That is, when display apparatus 1 is in the standby state, display apparatus 1 amplifies a detection signal of pyroelectric sensor 2 by the low amplification factor. When display apparatus 1 is in the operating state, display apparatus 1 amplifies a detection signal by the high amplification factor. Thus, display apparatus 1 can precisely detect the presence or motion of a human who watches display apparatus 1. Thus, display apparatus 1 that is easy to use and is power-saved can be implemented.

Note that, with display apparatus 1, when display 101 is extinguished, that is, when display apparatus 1 is in the standby state, first switch 204 is connected to the output terminal of first amplifier 202, and the amplification factor of the detection signal is set to the low amplification factor (see the lower diagram in FIG. 5). Thus, as shown in the upper diagram in FIG. 5, in the period before time point T51 (that is, in the state where no human is present in the area around display apparatus 1), the detection signal is amplified by the low amplification factor, the fluctuations of the voltage of the detection signal are relatively small, and the influence due to noise is also small. Thus, with display apparatus 1, the automatic ON function is suppressed from erroneously operating because of detector 200 erroneously detecting the detection signal.

Further, with display apparatus 1, the automatic ON function is executed by detector 200 in the low-sensitivity mode, and controller 207 activated thereby switches detector 200 to the high-sensitivity mode. Then, based on the result of detection by detector 200 in the high-sensitivity mode, the automatic OFF function is executed (steps S13 to S18).

In the example shown in the upper diagram in FIG. 5, a human approaching display apparatus 1 stays around display apparatus 1 during period 503 after time point T53 and watches display 101. In period 503, since detector 200 is set to the high-sensitivity mode (step S12), a relatively small movement of a human watching display apparatus 1 is also detected by detector 200 (step S14). By a relatively small movement of the human watching display apparatus 1 being frequently detected, timer 206 is reset before the measurement period reaches the set period (steps S15 and S16). Thus, with display apparatus 1, the automatic OFF function is prevented from erroneously operating, such as extinguishing display 101 while a human is watching display apparatus 1.

Further, in the example shown in the upper diagram in FIG. 5, the human having been watching display apparatus 1 leaves the area around display apparatus 1 at time point T57. In period 504 following time point T57, it is in a state where no human is present in the area around display apparatus 1. Accordingly, with display apparatus 1, ideally the automatic OFF function operates at the timing where the measurement period by timer 206 that has started after time point T56 when a movement of a human (heat source) was detected reaches set period 513. However, as has been described above, at time point T58, detector 200 detects the detection signal not attributed to a movement of a human, that is, erroneously detects noise components due to heat fluctuations. However, the measurement period by timer 206 which has been reset at time point T58 to again start measuring time reaches set period 513 at time point T59 (YES in step S15), and the automatic OFF function is executed at time point T59 at display apparatus 1 (steps S17 and S18). Thus, with display apparatus 1, when no human is present in the area around display apparatus 1, it is less likely that erroneous detection by detector 200 is repeated at a time interval shorter than the set period of timer 206. Accordingly, by the set period of timer 206 being properly set, the automatic OFF function can be properly operated with display apparatus 1.

[1-3. Effect and Others]

As described above, in the present exemplary embodiment, the electronic device is an electronic device that detects a movement of a subject and operates in accordance with a result of the detection. The electronic device includes a pyroelectric element, a detector, and a controller. The pyroelectric element senses a thermal change based on the pyroelectric effect. The detector detects the movement of the subject based on a detection signal output from the pyroelectric element. The controller sets the detection sensitivity of the detector based on a result of the detection by the detector. The detection sensitivity of the detector is set to low sensitivity or high sensitivity being higher in sensitivity than the low sensitivity. The controller sets the detection sensitivity to the high sensitivity when the detector detects the movement of the subject. The controller sets the detection sensitivity to the low sensitivity when a predetermined period has elapsed without the detector detecting the movement of the subject, in the state where the detection sensitivity is the high sensitivity.

Note that, display apparatus 1 is an example of the electronic device. Pyroelectric element 201 is an example of the pyroelectric element. Detector 200 is an example of the detector. Controller 207 is an example of the controller. A human in the area around display apparatus 1 is an example of the subject. The set period set on timer 206 (for example, set period 513) is an example of the predetermined period.

For example, in the example shown in the first exemplary embodiment, display apparatus 1 is an electronic device that detects a movement of a human (subject) in the area around display apparatus 1 and operates in accordance with a result of the detection. Display apparatus 1 includes pyroelectric element 201, detector 200, and controller 207. Pyroelectric element 201 senses a thermal change based on the pyroelectric effect. Detector 200 detects the movement of the human in the area around display apparatus 1 based on a detection signal output from pyroelectric element 201. Controller 207 sets the detection sensitivity of detector 200 based on the result of detection by detector 200. The detection sensitivity of detector 200 is set to low sensitivity or high sensitivity being higher in sensitivity than the low sensitivity (see FIG. 5). Controller 207 sets the detection sensitivity to the high sensitivity when detector 200 detects the movement of the human in the area around display apparatus 1. Controller 207 sets the detection sensitivity to the low sensitivity when set period 513 has elapsed without detector 200 detecting the movement of the human in the area around display apparatus 1, in the state where the detection sensitivity is the high sensitivity (see FIG. 6).

Further, in the example shown in the first exemplary embodiment, pyroelectric sensor 2 includes pyroelectric element 201, and detector 200. Controller 207 sets the detection sensitivity of detector 200 based on a result of the detection by detector 200.

Thus, with display apparatus 1, when detector 200 detects a movement of a human based on a detection signal from pyroelectric element 201, the detection sensitivity is set to the high sensitivity. Accordingly, despite the movement of the human from that time point being relatively small, the movement can be easily detected by detector 200. Thus, with display apparatus 1 that operates upon detection of a movement of a human by using pyroelectric element 201, the movement of the human can be precisely detected with a lower possibility of a detection failure (not being able to detect a movement of a human that is to be detected).

The controller of the electronic device may switch the detection sensitivity to the high sensitivity when the detector has detected the movement of the subject, in the state where the detection sensitivity is the low sensitivity. Further, the controller may maintain the detection sensitivity at the high sensitivity when the detector has detected the movement of the subject, in the state where the detection sensitivity is the high sensitivity.

For example, in the example shown in the first exemplary embodiment, controller 207 switches the detection sensitivity to the high sensitivity when detector 200 has detected the movement of the human, in the state where the detection sensitivity is the low sensitivity (step S12 in FIG. 6). Further, controller 207 maintains the detection sensitivity at the high sensitivity when detector 200 has detected the movement of the human, in the state where the detection sensitivity is the high sensitivity (steps S13 to S16 in FIG. 6).

Thus, with display apparatus 1, for example when detector 200 has detected a human approaching display apparatus 1, the detection sensitivity is switched from the low sensitivity to the high sensitivity. Accordingly, from that time point, even when the movement of the human becomes relatively small because the human has stopped moving to watch display apparatus 1 or the like, detector 200 set to the high sensitivity can detect such a small movement. Accordingly, display apparatus 1 can precisely detect a small movement of a human when he/she is staying in the area around display apparatus 1 with decreasing a detection failure.

The controller of the electronic device may be activated when the detector has detected the movement of the subject.

For example, in the example shown in the first exemplary embodiment, controller 207 is activated when detector 200 has detected the movement of the human.

Thus, by a human approaching display apparatus 1, detector 200 detects the movement of the human, and controller 207 is automatically activated. In this manner, by display apparatus 1 being automatically activated when a human approaches display apparatus 1, the convenience of the user using display apparatus 1 improves.

Further, controller 207 may be activated before detector 200 detects the movement of the human. That is, display apparatus 1 may enter a stand-by state before detector 200 detects the movement of the human. In this case, controller 207 may start an operation of lighting display 101 or the like when detector 200 has detected the movement of the human. That is, with display apparatus 1, the two states, namely the stand-by state and the operating state, may be automatically switched by the automatic ON/OFF function.

The controller of the electronic device may stop the operation of the electronic device when a predetermined period has elapsed and the detection sensitivity is set to the low sensitivity.

Note that, set period 513 set on timer 206 (for example, 10 minutes) is an example of the predetermined period.

For example, in the example shown in the first exemplary embodiment, controller 207 stops the operation of display apparatus 1 when set period 513 set on timer 206 has elapsed and the detection sensitivity is set to the low sensitivity. Thus, power saving of display apparatus 1 can be achieved.

In the electronic device, information indicating that the detection sensitivity is set to the low sensitivity may be output, when a predetermined period has elapsed and the detection sensitivity is set to the low sensitivity.

Figure 7:
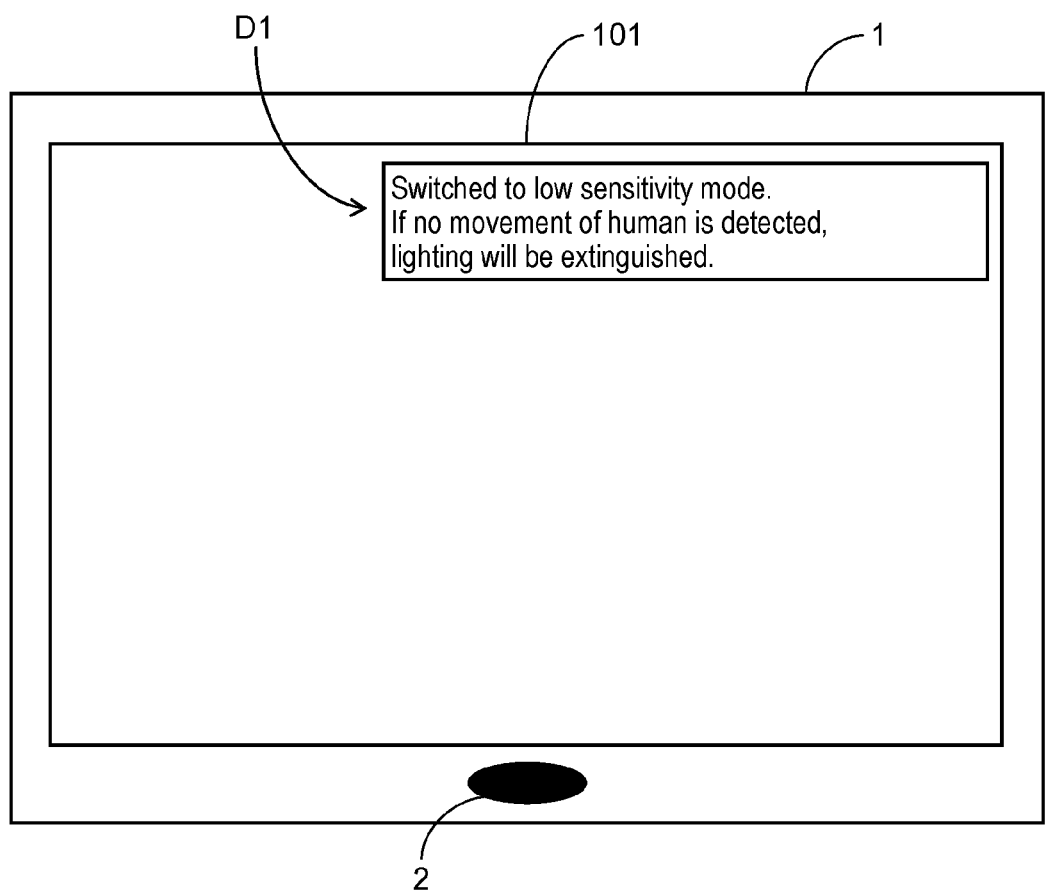
FIG. 7 is a diagram showing an example of a displayed image that is displayed on the display apparatus according to the first exemplary embodiment when the high-sensitivity mode is switched to the low-sensitivity mode.

Note that, message D1 shown in FIG. 7 is an example of information indicating that the detection sensitivity is set to the low sensitivity.

For example, with display apparatus 1 shown in the first exemplary embodiment, when set period 513 set on timer 206 has elapsed and the detection sensitivity is set to the low sensitivity, in place of stopping the operation of display apparatus 1, message D1 for informing the user that the detection sensitivity has been set to the low sensitivity may be displayed on display 101.

With reference to FIG. 7, an example of information provided to the user will be described.

FIG. 7 shows an example of a displayed image upon switching from the high-sensitivity mode to the low-sensitivity mode, which is displayed on display apparatus 1 according to the first exemplary embodiment.

After switching detector 200 from the high-sensitivity mode to the low-sensitivity mode in step S17 in FIG. 6, controller 207 may, for example as shown in FIG. 7, display predetermined message D1 as a displayed image informing the user that the detection sensitivity has been set to the low sensitivity, for a predetermined period (for example, one minute) on display 101.

In the exemplary display shown in FIG. 7, display 101 shows message D1 indicating "SWITCHED TO LOW-SENSITIVITY MODE. IF NO MOVEMENT OF HUMAN IS DETECTED, LIGHTING WILL BE EXTINGUISHED.". Thus, in case where a human watching display apparatus 1 is present in the area around display apparatus 1, he/she can recognize that lighting of display apparatus 1 will be extinguished unless he/she makes a large movement that would be detected even in the low-sensitivity mode. Thus, convenience of the user using display apparatus 1 improves.

Note that, with display apparatus 1, the information provided to the user upon switching from the high-sensitivity mode to the low-sensitivity mode is not limited to message D1 displayed on display 101. This information may be, for example, sound such as a voice message, alarming sound and the like.

Further, with display apparatus 1, display of message D1 on display 101 (or an audio message) may be provided prior to switching from the high-sensitivity mode to the low-sensitivity mode. For example, controller 207 may display message D1 on display 101 (or output an audio message) when the remaining measurement period for set period 513 set on timer 206 reaches a predetermined time (for example, when the remaining time becomes one minute). With display apparatus 1 structured in this manner, before the high-sensitivity mode is switched to the low-sensitivity mode, message D1 displayed on display 101 (or an audio message) can be presented to the human watching display apparatus 1. Thus, display apparatus 1 can inform the human that the human can recover display apparatus 1 (or that the human can prevent lighting of display apparatus 1 from being extinguished) with a movement smaller than that required after the sensitivity is switched to the low-sensitivity mode.

The controller of the electronic device may set the detection sensitivity to the low sensitivity or the high sensitivity by changing the amplification factor of the detection signal output from the pyroelectric element.

For example, in the example shown in the first exemplary embodiment, controller 207 sets the detection sensitivity of detector 200 to the low sensitivity or the high sensitivity, by changing the amplification factor of the detection signal output from pyroelectric element 201 (for example, setting the amplification factor to one of 10,000 and 30,000).

Thus, with a relatively simple circuit structure, switching of the detection sensitivity can be realized. Note that, the electronic component that determines the amplification factor, such as a resistor, may be an electronic component with which various constants, such as resistance, are fixed, or an electronic component with which constants are continuously variable.

The first exemplary embodiment described above shows the exemplary structure in which, in display apparatus 1, threshold voltages S1, S2 which values are previously set and fixed are to be the boundaries of the detection regions. However, the boundaries of the detection regions may not be fixed. In other words, the method of setting the detection sensitivity is not limited to changing the amplification factor for the detection signal. For example, the detection sensitivity may be set to the low sensitivity or the high sensitivity by controller 207 changing threshold voltages S1, S2, when detector 200 compares the voltage of the detection signal against threshold voltages S1, S2.

That is, the detector may detect the movement of the subject by comparing the voltage of the detection signal against a predetermined threshold voltage, and the controller may set the detection sensitivity of the detector to the low sensitivity or the high sensitivity, by changing the threshold voltage.

In the following, with reference to FIG. 8, a description will be given of an exemplary operation in which the detection sensitivity of detector 200 is switched by threshold voltages S1, S2 being changed in display apparatus 1.

Figure 8:
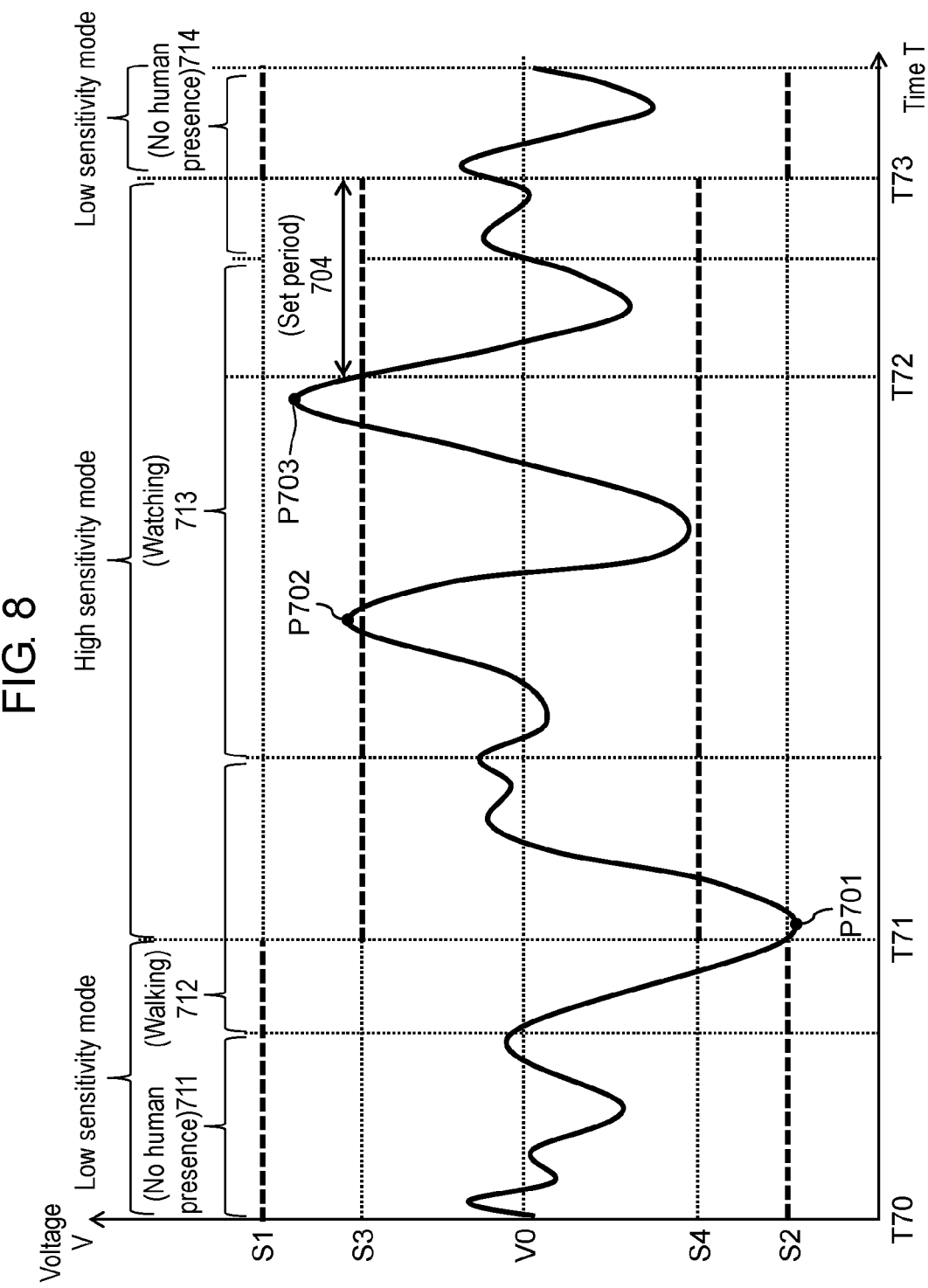
FIG. 8 is a waveform diagram showing an example of a variation of the detection sensitivity switching operation that is executed in the display apparatus according to the first exemplary embodiment.

FIG. 8 is a waveform diagram showing a variation of the detection sensitivity switching operation executed in display apparatus 1 according to the first exemplary embodiment. Note that, the waveform diagram of FIG. 8 represents, similarly to those of FIGS. 3 to 5, an example of waveform at a detection signal of detector 200.

At time point T70 in FIG. 8, detector 200 of display apparatus 1 is set to the low-sensitivity mode. In the low-sensitivity mode, the threshold voltages of detecting circuit 205 are set to threshold voltages S1, S2. Thereafter, at time point T71, detector 200 detects that the voltage of the detection signal has become lower than threshold voltage S2, and outputs a detection result signal to controller 207. Controller 207 having received the detection result signal changes, in place of controlling first switch 204 as shown in FIG. 5, threshold voltages S1, S2 set on detecting circuit 205.

Specifically, controller 207 having received the detection result signal sets, in place of threshold voltages S1, S2 for the low-sensitivity mode, threshold voltages S3, S4 for the high-sensitivity mode on detecting circuit 205. As exemplarily shown in FIG. 8, threshold voltages S3, S4 for the high-sensitivity mode are set such that the voltage difference between threshold voltages S3, S4 (hereinafter referred to as the "threshold value width") becomes smaller than the threshold value width between threshold voltages S1, S2 for the low-sensitivity mode. Thus, detector 200 becomes capable of detecting peaks P702, P703 of the detection signal which are smaller than peak P701 of the detection signal. Note that, in the example shown in FIG. 8, peak P701 is the peak in the detection signal caused by a movement of a human in transit, and peaks P702, P703 are peaks in the detection signal caused by a movement of a human watching display apparatus 1.

Further, in the example shown in FIG. 8, at time point T73, controller 207 resets the threshold voltages from threshold voltages S3, S4 for the high-sensitivity mode to threshold voltages S1, S2 for the low-sensitivity mode. Note that, time point T73 is the time point where set period 704 set on timer 206 has elapsed since time point T72 when the voltage of the detection signal by detector 200 becomes equal to or smaller than threshold voltage S3 after exceeding peak P703. Thus, detector 200 is switched from the high-sensitivity mode to the low-sensitivity mode.

As has been described above, with display apparatus 1, the detection sensitivity of detector 200 can be set to the high sensitivity or the low sensitivity also by changing the threshold voltages. The changing the threshold voltages can be performed by controlling detector 200 with a predetermined program. Accordingly, with detector 200 structured in such a manner, changing the threshold voltages can easily finely adjust the detection sensitivity.

The electronic device may structure a display apparatus that displays an image.

For example, in the example shown in the first exemplary embodiment, display apparatus 1 equipped with pyroelectric sensor 2 structures a TV or the like that displays an image.

With display apparatus 1, controlling the function of automatically turning ON/OFF display power supply 210 using pyroelectric element 201 of small size can attain power saving. A TV on which television programs are displayed is required to continuously display images with no breaks. Accordingly, when a TV is erroneously turned off despite the presence of a human watching the TV because of the human not being detected (because of an occurrence of detection failure), convenience of the user is significantly impaired. However, with display apparatus 1 according to the present exemplary embodiment, after display apparatus 1 is activated by the automatic ON function, the low-sensitivity mode is automatically switched to the high-sensitivity mode. This reduces detection failure and a movement of a human watching display apparatus 1 can be precisely detected. Accordingly, with display apparatus 1, the automatic OFF function can be prevented from erroneously operating due to detection failure of a human watching display apparatus 1, whereby convenience of the user can improve.

Note that, in the present exemplary embodiment, display apparatus 1 is not limited to a TV. Display apparatus 1 may be, for example, a display used for a computer, or a screen interface device that is mounted on various kinds of electronic devices.

Note that, in the first exemplary embodiment, the description has been given of the exemplary structure in which, in display apparatus 1, power is supplied to main memory device 208 from other power supply (not shown) which is separately provided from display power supply 210. This is to reduce the time that is taken in display apparatus 1 for transiting from the standby state to the operating state. However, main memory device 208 may be supplied with power from display power supply 210.

Second Exemplary Embodiment

In the following, with reference to FIGS. 9 to 11, a description will be given of a second exemplary embodiment.

In the first exemplary embodiment, a description has been given of the exemplary structure in which, in display apparatus 1, the detection sensitivity of detector 200 is switched between the high sensitivity and the low sensitivity. In the present exemplary embodiment, a description will be given of an exemplary structure in which the detection sensitivity is corrected in accordance with the ambient temperature.

[2-1. Structure]

In the following, a description will be given of display apparatus 1A according to an exemplary embodiment.

Note that, as to display apparatus 1A according to the second exemplary embodiment, constituents that operate in a substantially same manner as those of display apparatus 1 according to the first exemplary embodiment are denoted by the identical reference marks, and a description thereof will be omitted. In the following, the description will be focused on the difference from display apparatus 1 according to the first exemplary embodiment, and a description of the operations substantially identical to those of the display apparatus 1 according to the first exemplary embodiment may be omitted.

Figure 9:
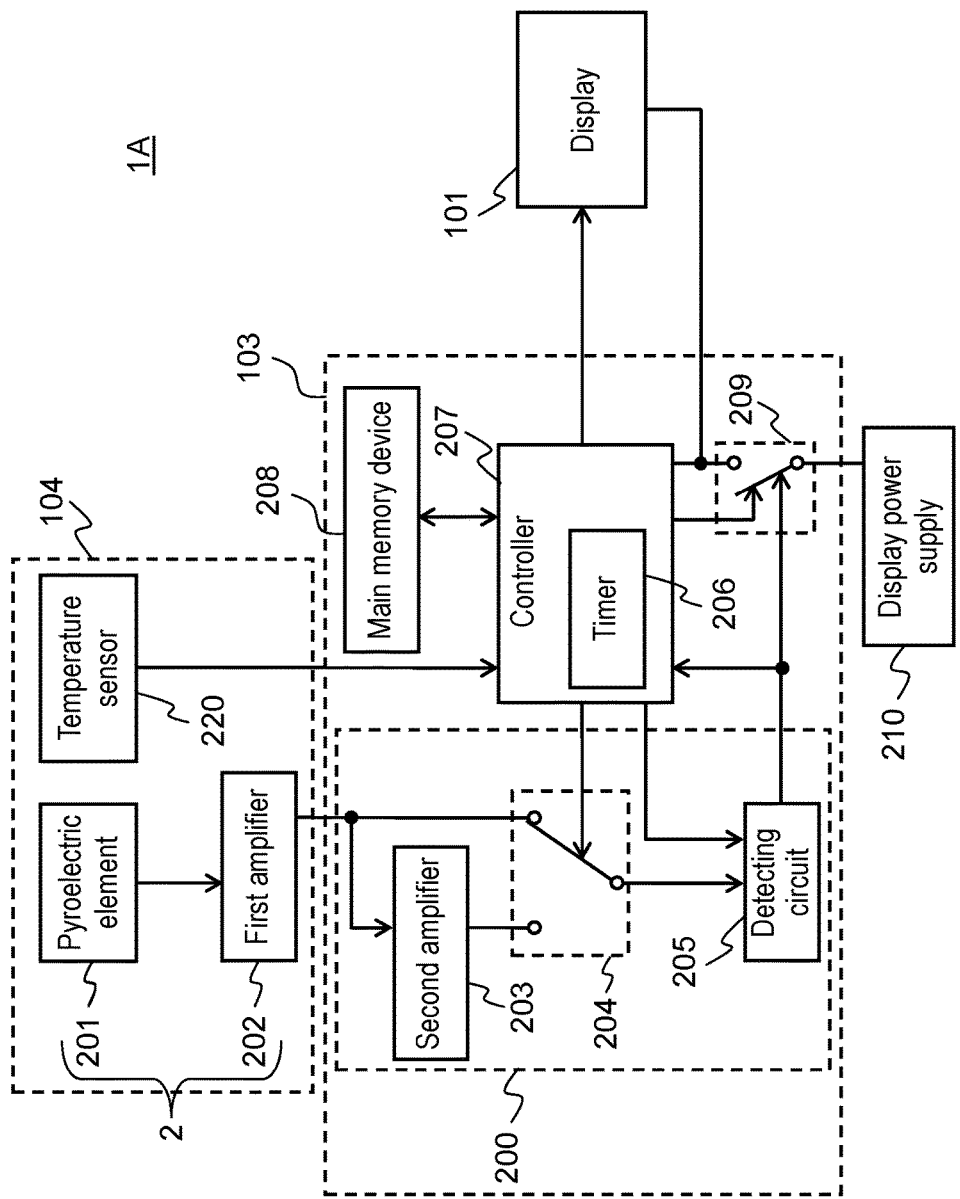
FIG. 9 is a block diagram schematically showing an exemplary structure of a display apparatus according to a second exemplary embodiment.

FIG. 9 is a block diagram schematically showing an exemplary structure of display apparatus 1A according to the second exemplary embodiment.

As shown in FIG. 9, display apparatus 1A has the structure substantially identical to display apparatus 1 described in the first exemplary embodiment. Display apparatus 1A further includes, in addition to that structure, temperature sensor 220. Temperature sensor 220 is, for example, a thermistor, and measures the temperature around temperature sensor 220. In the present exemplary embodiment, temperature sensor 220 is attached to front substrate 104 in close proximity to pyroelectric element 201. Thus, temperature sensor 220 can measure the temperature near pyroelectric element 201. Thus, temperature sensor 220 can measure the temperature of pyroelectric element 201 relatively precisely, though it is performed in an indirect manner.

Temperature sensor 220 outputs a temperature signal that represents a measured temperature value to controller 207 on signal processing substrate 103. Controller 207 controls detecting circuit 205 of detector 200 based on the temperature signal from temperature sensor 220, to vary threshold voltage S1 and threshold voltage S2.

[2-2. Operation]

Figure 10:
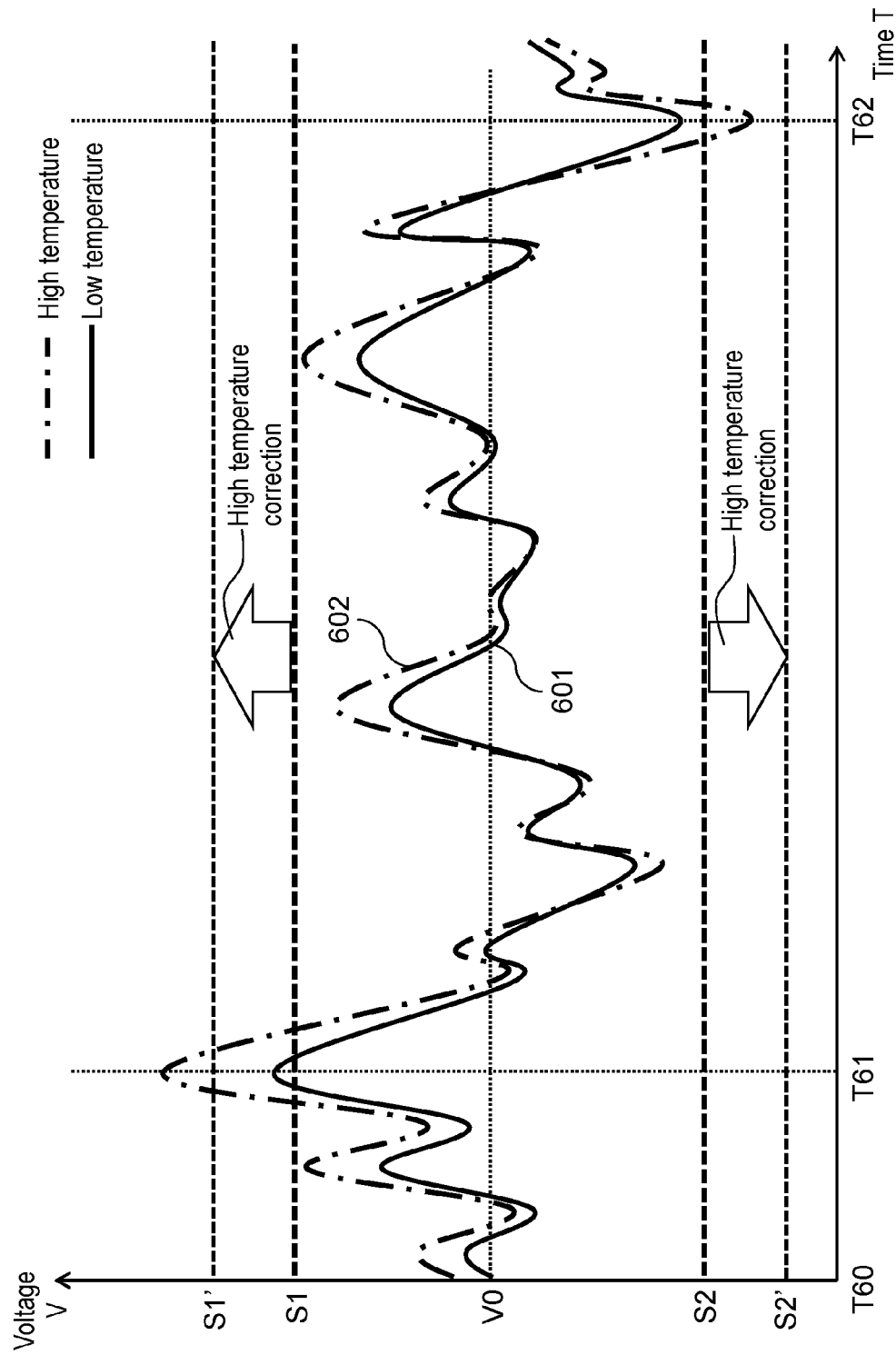
FIG. 10 is a waveform diagram showing an example of detection signals that are detected by a pyroelectric sensor of the display apparatus in a low temperature mode and a high temperature mode according to the second exemplary embodiment.

FIG. 10 is a waveform diagram showing an example of detection signals in a low temperature mode and a high temperature mode detected by pyroelectric sensor 2 of display apparatus 1A according to the second exemplary embodiment. In FIG. 10, the horizontal axis represents time T and the vertical axis represents voltage V. Further, in FIG. 10, waveform 601 in a solid line represents an exemplary waveform of a detection signal output from pyroelectric sensor 2 in the environment of a temperature set as a low temperature (low temperature), and waveform 602 in long and short dashed lines represents an exemplary waveform of a detection signal output from pyroelectric sensor 2 in the environment of a temperature being higher than the temperature (high temperature) in the low temperature environment where waveform 601 is obtained.

Detection of heat by pyroelectric sensor 2 tends to be influenced by the ambient environment. In particular, the amplitude of a signal output from pyroelectric element 201 tends to fluctuate by the state of temperature around pyroelectric sensor 2. In the exemplary waveforms shown in FIG. 10, the number of times of the voltage of waveform 601 in the low temperature mode reaching the detection regions exceeding the region between threshold voltages S1, S2 is once (at time point T61 and its surrounding). On the other hand, the number of times of the voltage of waveform 602 reaching the detection regions exceeding the region between threshold voltages S1, S2 is twice (at time point T61 and its surrounding, and at time point T62 and its surrounding).

As described above, with pyroelectric sensor 2, the voltage of an output signal tends to become high because of the increased sensitivity of pyroelectric element 201 in the high temperature environment. Accordingly, in the high temperature environment, the frequency of a detection signal of the detector 200 reaching the detection regions tends to become high. Accordingly, with the display apparatus in the high temperature environment, for example with the display apparatus in the operating state, timer 206 may be repeatedly reset and hinder activation of the automatic OFF function. Thus, it may become difficult to return the display apparatus to the standby state.

Therefore, with display apparatus 1A according to the present exemplary embodiment, the temperature of pyroelectric sensor 2 is indirectly measured using temperature sensor 220, and the detection sensitivity of detector 200 is corrected according to the measured temperature.

Figure 11:
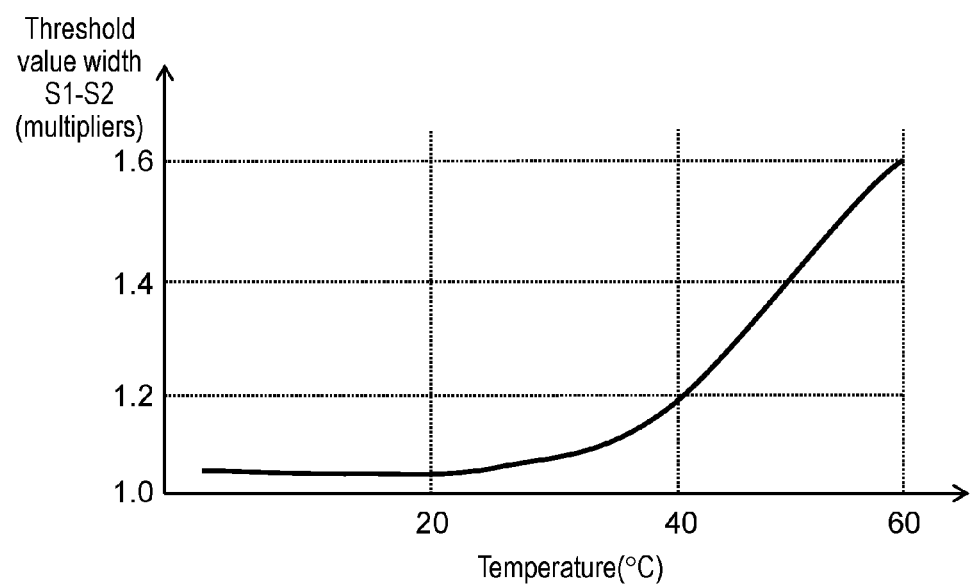
FIG. 11 is a graph showing an example of a detection sensitivity calibration curve corresponding to the temperature set in the display apparatus according to the second exemplary embodiment.

FIG. 11 is a graph showing an example of a calibration curve of the detection sensitivity according to the temperature, which is set on display apparatus 1A according to the second exemplary embodiment. In FIG. 11, the horizontal axis represents the temperature (° C.) of front substrate 104 where pyroelectric sensor 2 is disposed, and the vertical axis represents multipliers for threshold value width S1–S2 (the voltage difference between threshold voltages S1, S2).

Display apparatus 1A corrects threshold voltages S1, S2 so as to change threshold value width S1–S2 according to the temperature measured by temperature sensor 220 (see FIG. 10). The curve shown in FIG. 11 defines multipliers for correcting threshold value width S1–S2 in case where the temperature around pyroelectric sensor 2 changes from the predetermined reference temperature (for example, 23° C.).

With display apparatus 1A, information indicating the relationship between the temperature measured by temperature sensor 220 and the multipliers for correcting threshold value width S1–S2 are previously stored in main memory device 208. This information indicating the relationship between the temperature and the multipliers is represented by, for example, the function showing the curve in FIG. 11 or the like. Then, controller 207 refers to the information showing the relationship between the temperature and the multipliers shown in FIG. 11, to correct threshold voltages S1, S2.

Specifically, controller 207 determines a multiplier referring to the information indicative of the relationship between the temperature and the multipliers based on the temperature measured by temperature sensor 220, and multiplies threshold value width S1–S2 of the reference temperature by the multiplier. Then, threshold voltages S1, S2 are corrected such that threshold value width S1–S2 multiplied by the multiplier becomes corrected threshold value width S1'–S2'. Thus, corrected threshold voltages S1', S2' are set.

In the case where the temperature correction based on the curve exemplarily shown in FIG. 11 is performed with display apparatus 1A, when the measured temperature around pyroelectric element 201 is equal to or smaller than 23° C., corrected threshold value width S1'–S2' is substantially equal to uncorrected threshold value width S1–S2, and the multiplier is set to about 1.0. When the measured temperature becomes higher than 23° C., corrected threshold value width S1'–S2' becomes gradually larger. When the temperature measured by pyroelectric element 201 is 40° C., corrected threshold value width S1'–S2' is set to be about 1.2 times as large as uncorrected threshold value width S1–S2. When the temperature measured by pyroelectric element 201 is 50° C., corrected threshold value width S1'–S2' is set to be about 1.4 times as large as uncorrected threshold value width S1–S2. When the temperature measured by pyroelectric element 201 is 60° C., corrected threshold value width S1'–S2' is set to be about 1.6 times as large as uncorrected threshold value width S1–S2. As described above, with display apparatus 1A, corrected threshold voltages S1', S2' are set such that threshold value width S1'–S2' becomes larger as the temperature around pyroelectric element 201 becomes higher.

Thus, in the example shown in FIG. 10, with display apparatus 1A, the number of times of the voltage of waveform 601 in the high temperature mode exceeding the region between corrected threshold voltages S1', S2' is once (at time point T61 and its surrounding) similarly to the low temperature mode. As described above, with display apparatus 1A, in detector 200, threshold voltages S1, S2 are corrected based on the temperature measured by temperature sensor 220. Thus, with display apparatus 1A, even when a signal output from pyroelectric element 201 fluctuates by the temperature of pyroelectric element 201, the influence thereof can be suppressed.

Note that, corrected threshold voltages S1', S2' may be set with reference to reference voltage V0, such that the difference between threshold voltage S1' and threshold voltage S1 (the absolute value) and the difference between threshold voltage S2' and threshold voltage S2 (the absolute value) become substantially equal to each other.

[2-3. Effect and the Like]

As has been described above, in the present exemplary embodiment, the electronic device further includes the temperature sensor that measures temperatures, and the controller corrects the detection sensitivity according to the temperature measured by the temperature sensor.

Note that, display apparatus 1A is an example of the electronic device. Temperature sensor 220 is an example of the temperature sensor.

For example, in the example shown in the second exemplary embodiment, display apparatus 1A further includes temperature sensor 220 that measures temperatures. Controller 207 corrects the detection sensitivity according to the temperature measured by temperature sensor 220.

In display apparatus 1A, threshold voltages S1, S2 are corrected according to the temperature around pyroelectric element 201 measured by temperature sensor 220, whereby the detection sensitivity is corrected. Thus, display apparatus 1A can improve precision of detecting a movement of a human by using pyroelectric element 201.

Note that, in the second exemplary embodiment, a description has been given of the exemplary structure in which: display apparatus 1A includes temperature sensor 220, temperature sensor 220 measures a temperature, and the detection sensitivity of temperature detector 200 is corrected based on the measured temperature. However, with display apparatus 1A, for example, the detection sensitivity may be corrected without using temperature sensor 220. For example, a load of a portion that tends to generate heat in display apparatus 1A may be measured, and controller 207 may correct the detection sensitivity of detector 200 based on the measured value of the load. Further, as to a portion where the temperature highly possibly will rise in display apparatus 1A, a temperature increase value corresponding to a load of the portion may be previously estimated, and the threshold value may be uniquely set according to the load. For example, with display apparatus 1A, the load of backlight of display 101 is large and the backlight tends to generate heat. In the case where the brightness of the backlight of display 101 can be set by the user, the correspondence between the brightness value of the backlight and the threshold value may be previously stored in main memory device 208 or the like, and the threshold value may be set according to the set value of the brightness of the backlight.

Other Exemplary Embodiment

As has been described above, as illustration of the technique disclosed in the present application, the first and second exemplary embodiments have been described. However, the technique of the present disclosure is not limited thereto, and can be applied also to an exemplary embodiment in which any change, replacement, addition, omission and the like are made. Further, it is also possible to obtain a new exemplary embodiment by combining the constituents described in the first and second exemplary embodiments.

In the following, other exemplary embodiment is exemplarily shown.

In the first and second exemplary embodiments, as an example of the electronic device that detects a movement of a human with a pyroelectric sensor, display apparatus 1 (1A) has been described. However, the electronic device of the present disclosure is not limited to a display apparatus, and can be applied to every electronic device having a pyroelectric element. For example, the electronic device of the present disclosure may be an air conditioner, a fan, a lighting device, an audio device, a surveillance camera and the like. For example, by applying the above-described automatic ON/OFF function based on detection of a movement of a human, activating/stopping the driver of an air conditioner or a fan in place of the display of the display apparatus may be performed.

Further, the operation activated/stopped by application of the automatic ON/OFF function of the present disclosure may not be the entire operation of the electronic device. Part of the operation in the electronic device may be target to be activated/stopped. For example, the electronic device may be controlled using a sophisticated system that consumes much power as compared to a pyroelectric element, for example, a voice recognition system. Here, the automatic ON/OFF function by a pyroelectric element may be applied in activating/stopping the voice recognition system.

Figure 12:
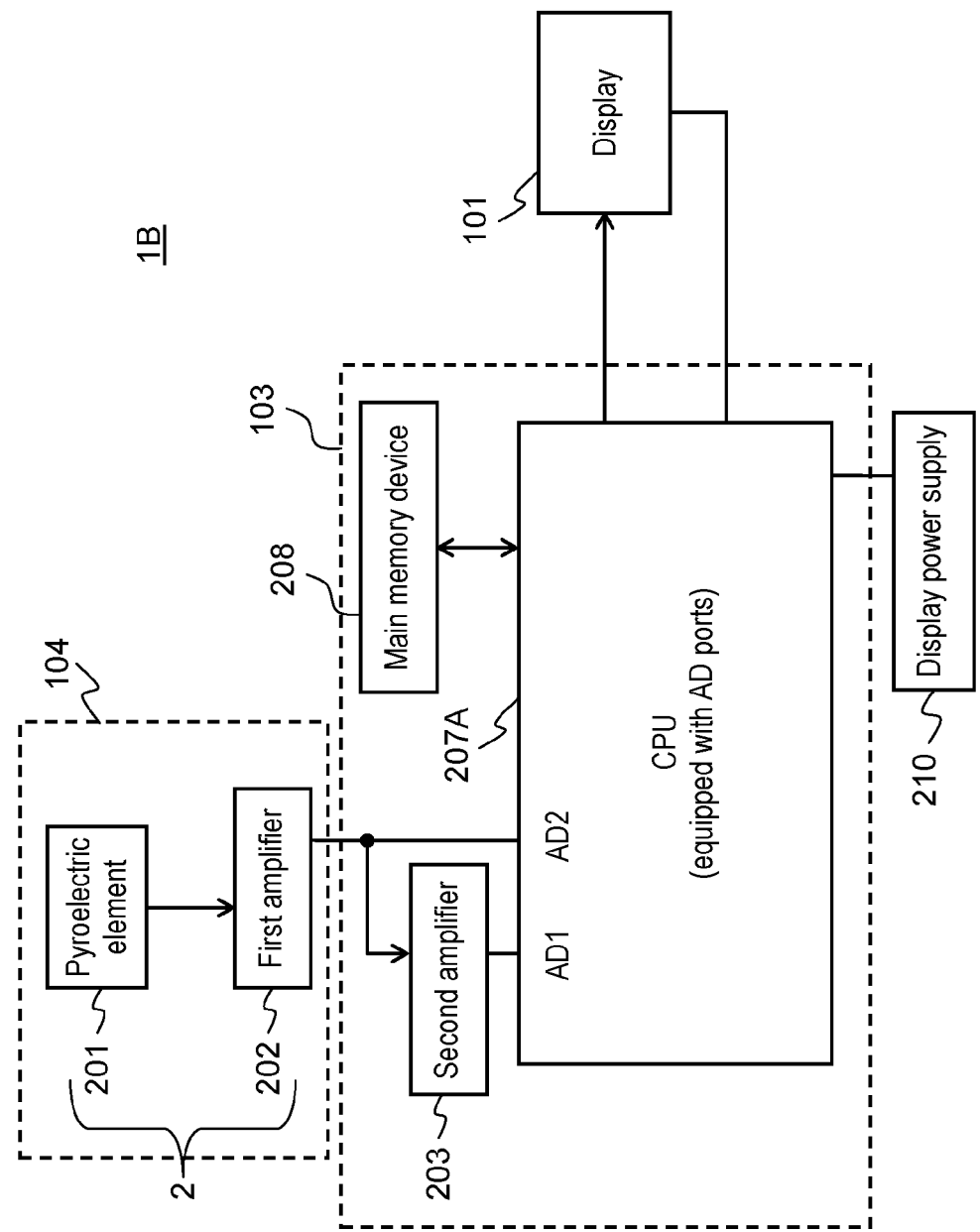
FIG. 12 is a block diagram schematically showing an exemplary structure of an electronic device according to Variation 1 of the exemplary embodiment.

Further, in the first and second exemplary embodiments, the example in which detector 200 is structured by an electronic circuit on signal processing substrate 103 has been described. The detector of the present disclosure may be structured to include hardware circuit such as a dedicated electronic circuit or a reconfigurable electronic circuit (an ASIC (Application Specific Integrated Circuit), an FPGA (Field Programmable Gate Array) or the like) that is designed to realize predetermined functions (the functions disclosed in the first and second exemplary embodiments). Further, the functions of the detector may be realized by software, or by cooperation of hardware and software. With reference to FIG. 12, a description will be given of variations of the detector.

FIG. 12 is a block diagram schematically showing an exemplary structure of electronic device 1B according to Variation 1 of the exemplary embodiment. Note that, as to electronic device 1B according to Variation 1, constituents that operate in a substantially same manner as those of display apparatus 1 according to the first exemplary embodiment are denoted by the identical reference marks, and a description thereof will be omitted.

As shown in FIG. 12, electronic device 1B includes CPU 207A that controls the operation of electronic device 1B. CPU 207A has first AD port AD1 and second AD port AD2. First AD port AD1 is connected to second amplifier 203, and second AD port AD2 is connected to first amplifier 202. CPU 207A is capable of executing a program that is created to realize functions which are substantially identical to those of detector 200. CPU 207A can realize functions which are substantially identical to those of detector 200, based on a detection signal of the high amplification factor input from first AD port AD1 and a detection signal of the low amplification factor input from second AD port AD2.

Further, CPU 207A may execute a program that is created to execute, for example, the processes shown in the flowchart of FIG. 6. In electronic device 1B, CPU 207A is an example of the detector, and an example of the controller. Note that, the program executed by CPU 207A may be stored in main memory device 208, or may be stored in a program-dedicated storage apparatus (not shown).

Figure 13:
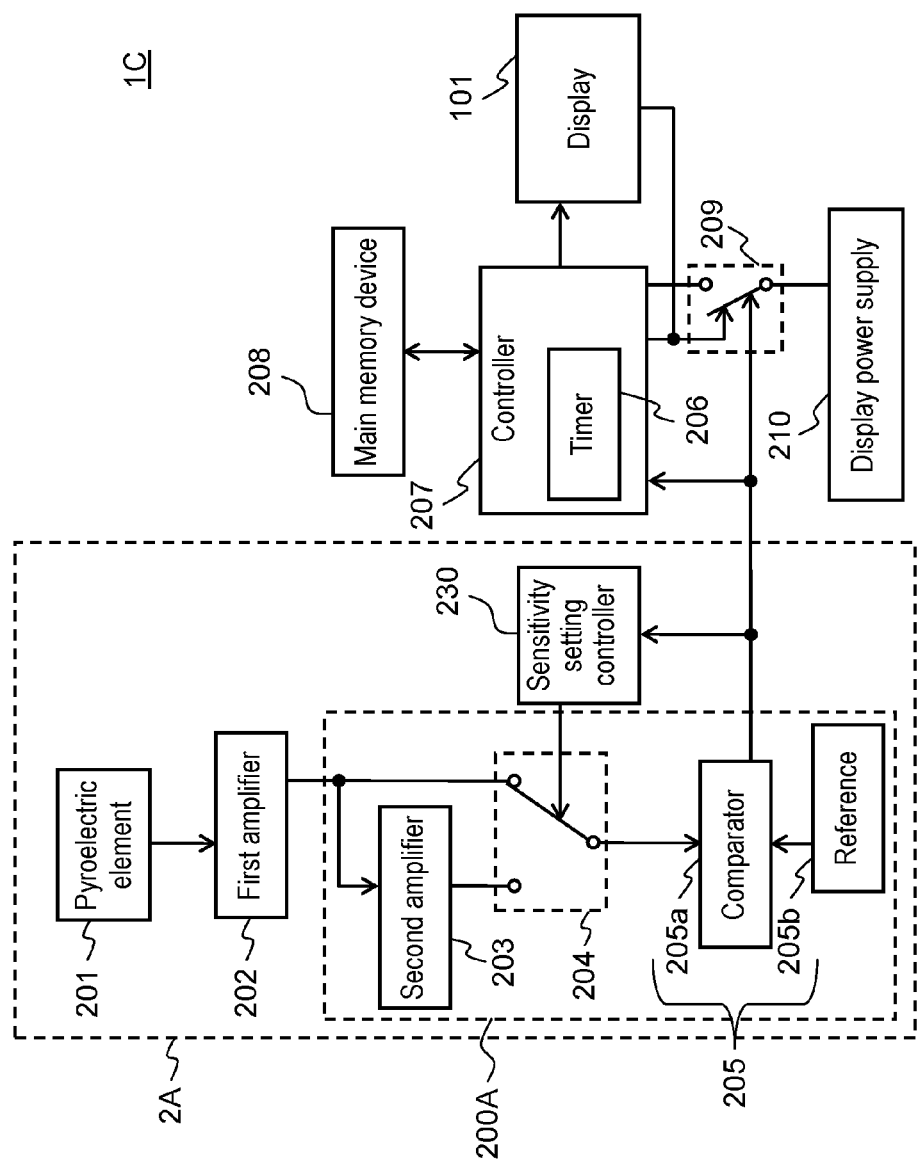
FIG. 13 is a block diagram schematically showing an exemplary structure of an electronic device and a pyroelectric sensor according to Variation 2 of the exemplary embodiment.

In the first and second exemplary embodiments, the exemplary structure in which the detection sensitivity of detector 200 is set by controller 207 has been described. However, setting of the detection sensitivity may be performed in the pyroelectric sensor. With reference to FIG. 13, a description will be given of an example of the pyroelectric sensor in which setting of the detection sensitivity is performed.

FIG. 13 is a block diagram schematically showing an exemplary structure of electronic device 1C and pyroelectric sensor 2A according to Variation 2 of the exemplary embodiment. Note that, as to electronic device 1C according to Variation 2, constituents that operate in a substantially same manner as those of display apparatus 1 according to the first exemplary embodiment are denoted by the identical reference marks, and a description thereof will be omitted.

Electronic device 1C includes pyroelectric sensor 2A, controller 207, main memory device 208, second switch 209, display power supply 210, and display 101.

Note that, pyroelectric sensor 2A may be installed inside electronic device 1C, or may be structured separately from electronic device 1C. For example, pyroelectric sensor 2A may be connected to electronic device 1C via a wire (or connected wirelessly), and may transmit a detection result signal by detector 200A to electronic device 1C.

As shown in FIG. 13, pyroelectric sensor 2A further includes, in addition to the structure of pyroelectric sensor 2 shown in FIG. 2 (that is, pyroelectric element 201 and first amplifier 202), detector 200A and sensitivity setting controller 230.

Detector 200A includes second amplifier 203, first switch 204, comparator 205a, and reference voltage source 205b. Note that, detecting circuit 205 is structured to include comparator 205a and reference voltage source 205b. Reference voltage source 205b supplies a threshold voltage to comparator 205a. Comparator 205a compares the voltage of a detection signal output from first switch 204 and the threshold voltage against each other, and outputs a signal based on the comparison result (a detection result signal) to sensitivity setting controller 230, controller 207, and second switch 209.

Similarly to controller 207 according to the first exemplary embodiment, sensitivity setting controller 230 controls the switching operation of first switch 204 based on the detection result signal from detector 200A. Sensitivity setting controller 230 may be structured by any hardware circuit such as a dedicated electronic circuit or reconfigurable electronic circuit (an ASIC, an FPGA or the like) that is designed to realize the above-described functions.

Further, in place of controlling first switch 204, sensitivity setting controller 230 may set the detection sensitivity of detector 200A by changing the threshold voltage by controlling reference voltage source 205b that supplies the threshold voltage to comparator 205a in detector 200A. In this case, in detector 200A, second amplifier 203 and first switch 204 may be omitted.

As has been described above, in the present exemplary embodiment, a pyroelectric sensor includes a pyroelectric element, a detector, and a sensitivity setting controller. The pyroelectric element senses a thermal change based on the pyroelectric effect. The detector detects a movement of a subject based on a detection signal output from the pyroelectric element. The sensitivity setting controller sets the detection sensitivity of the detector based on a result of the detection by the detector. The detection sensitivity is set to low sensitivity or high sensitivity being higher in sensitivity than the low sensitivity. The sensitivity setting controller sets the detection sensitivity to the high sensitivity when the detector has detected a movement of the subject. The sensitivity setting controller sets the detection sensitivity to the low sensitivity when a predetermined period has elapsed without the detector detecting a movement of the subject in the state where the detection sensitivity is the high sensitivity.

Note that, electronic device 1C is an example of the electronic device. Pyroelectric sensor 2A is an example of the pyroelectric sensor. Pyroelectric element 201 is an example of the pyroelectric element. Detector 200A is an example of the detector. Sensitivity setting controller 230 is an example of the sensitivity setting controller. A human in the area around electronic device 1C (or around display 101) is an example of the subject. The set period set on timer 206 (for example, set periods 513, 704) is an example of the predetermined period.

For example, in the example shown in Variation 2 of the exemplary embodiment, pyroelectric sensor 2A includes pyroelectric element 201, detector 200A, and sensitivity setting controller 230. Pyroelectric element 201 senses a thermal change based on the pyroelectric effect. Detector 200A detects a movement of a human in the area around electronic device 1C (or around display 101) based on a detection signal output from pyroelectric element 201. Sensitivity setting controller 230 sets the detection sensitivity of detector 200A based on a result of the detection by detector 200A. The detection sensitivity is set to low sensitivity or high sensitivity being higher in sensitivity than the low sensitivity. Sensitivity setting controller 230 sets the detection sensitivity to the high sensitivity when detector 200A has detected a movement of a human. Sensitivity setting controller 230 sets the detection sensitivity to the low sensitivity when a predetermined period has elapsed without detector 200A detecting a movement of a human in the state where the detection sensitivity is the high sensitivity.

Thus, with pyroelectric sensor 2A, the detection sensitivity is set to the high sensitivity or the low sensitivity as appropriate when a movement of a human is detected by pyroelectric element 201. Accordingly, with electronic device 1C that operates by detection of a movement of a human by using pyroelectric sensor 2A, a movement of a human can be precisely detected with a lower possibility of a detection failure (not being able to detect a movement of a human that is to be detected).

In the foregoing, as illustration of the technique of the present disclosure, the exemplary embodiments and variations have been described. The accompanying drawings and the detailed description have been provided for the illustration.

Accordingly, constituents shown in the accompanying drawings and the detailed description may include not only the constituents essential for solving the problem, but also the constituents not being essential for solving the problem in order to illustrate the technique. Therefore, one should not immediately find that those non-essential constituents are essential based on the fact that such non-essential constituents are disclosed in the accompanying drawings and the detailed description.

Further, the exemplary embodiments and variations are merely illustrations of the technique of the present disclosure. Therefore, they can be subjected to various modifications, replacement, addition or omission within the scope of claims or an equivalent thereof.

INDUSTRIAL APPLICABILITY

The present disclosure is applicable to an electronic device and a pyroelectric sensor that operate upon detection of a movement of a human. Specifically, the present disclosure is applicable to a display apparatus such as a TV, an air conditioner, a fan, a lighting device, an audio device, a surveillance camera and the like.

REFERENCE MARKS IN THE DRAWINGS 1, 1A: display apparatus
1B, 1C: electronic device
2, 2A: pyroelectric sensor
101: display
102: lens
103: signal processing substrate
104: front substrate
200, 200A: detector
201: pyroelectric element
202: first amplifier
203: second amplifier
204: first switch
205: detecting circuit
205a: comparator
205b: reference voltage source
206: timer
207: controller
207A: CPU
208: main memory device
209: second switch
210: display power supply
220: temperature sensor
230: sensitivity setting controller
AD1: first AD port
AD2: second AD port

The invention claimed is:

1. An electronic device that detects a movement of a subject and operates in accordance with a result of the detection, the electronic device comprising:
a pyroelectric element that senses a thermal change, based on a pyroelectric effect;
a detector that detects the movement of the subject, based on a detection signal output from the pyroelectric element; and
a controller that sets detection sensitivity of the detector, based on a result of the detection by the detector,
wherein the detection sensitivity is set to low sensitivity or high sensitivity being higher in sensitivity than the low sensitivity,
the controller sets the detection sensitivity to the high sensitivity when the detector has detected the movement of the subject, and
the controller sets the detection sensitivity to the low sensitivity when a predetermined period has elapsed without the detector detecting the movement of the subject in a state where the detection sensitivity is the high sensitivity.

2. The electronic device according to claim 1, wherein
the controller switches the detection sensitivity to the high sensitivity when the detector has detected the movement of the subject in a state where the detection sensitivity is the low sensitivity, and
the controller maintains the detection sensitivity at the high sensitivity when the detector has detected the movement of the subject in the state where the detection sensitivity is the high sensitivity.

3. The electronic device according to claim 1, wherein the controller is activated when the detector has detected the movement of the subject.

4. The electronic device according to claim 1, wherein the controller stops an operation of the electronic device when the controller sets the detection sensitivity to the low sensitivity upon lapse of the predetermined period.

5. The electronic device according to claim 1, wherein, when the detection sensitivity is set to the low sensitivity upon lapse of the predetermined period, information indicating the detection sensitivity being set to the low sensitivity is output.

6. The electronic device according to claim 1, wherein the controller sets the detection sensitivity to the low sensitivity or the high sensitivity by changing an amplification factor of the detection signal output from the pyroelectric element.

7. The electronic device according to claim 1, wherein
the detector detects the movement of the subject by comparing a voltage of the detection signal against a predetermined threshold voltage, and
the controller sets the detection sensitivity to the low sensitivity or the high sensitivity by changing the threshold voltage.

8. The electronic device according to claim 1, further comprising a temperature sensor that measures a temperature around the pyroelectric element,
wherein the controller corrects the detection sensitivity according to the temperature measured by the temperature sensor.

9. The electronic device according to claim 1, wherein the electronic device configures a display apparatus that displays an image.

10. A pyroelectric sensor comprising:
a pyroelectric element that senses a thermal change, based on a pyroelectric effect;
a detector that detects a movement of a subject, based on a detection signal output from the pyroelectric element; and
a sensitivity setting controller that sets detection sensitivity of the detector, based on a result of the detection by the detector,
wherein the detection sensitivity is set to low sensitivity or high sensitivity being higher in sensitivity than the low sensitivity,
the sensitivity setting controller sets the detection sensitivity to the high sensitivity when the detector has detected the movement of the subject, and the sensitivity setting controller sets the detection sensitivity to the low sensitivity when a predetermined period has elapsed without the detector detecting the movement of the subject in a state where the detection sensitivity is the high sensitivity.

* * * * *